(12) United States Patent
Petty

(10) Patent No.: US 10,118,658 B2
(45) Date of Patent: Nov. 6, 2018

(54) ADJUSTABLE SADDLE

(71) Applicant: Jon A. Petty, St. George, UT (US)

(72) Inventor: Jon A. Petty, St. George, UT (US)

( * ) Notice: Subject to any disclaimer, the term of this patent is extended or adjusted under 35 U.S.C. 154(b) by 105 days.

(21) Appl. No.: 15/264,945

(22) Filed: Sep. 14, 2016

(65) Prior Publication Data

US 2017/0073028 A1 Mar. 16, 2017

Related U.S. Application Data

(60) Provisional application No. 62/218,338, filed on Sep. 14, 2015.

(51) Int. Cl.
| | |
|---|---|
| *B62J 1/10* | (2006.01) |
| *B62J 1/00* | (2006.01) |
| *B62J 1/08* | (2006.01) |
| *B62J 1/20* | (2006.01) |
| *B62J 1/26* | (2006.01) |

(52) U.S. Cl.
CPC ............ *B62J 1/007* (2013.01); *B62J 1/005* (2013.01); *B62J 1/08* (2013.01); *B62J 1/10* (2013.01); *B62J 1/20* (2013.01); *B62J 1/26* (2013.01)

(58) Field of Classification Search
CPC ....... B62J 1/08; B62J 1/10; B62J 1/005; B62J 1/007
USPC ........................ 297/201–203, 215.13, 215.14
See application file for complete search history.

(56) References Cited

U.S. PATENT DOCUMENTS

| | | | | |
|---|---|---|---|---|
| 593,331 | A * | 11/1897 | Noirit ................. | B62J 1/005 297/201 |
| 622,357 | A * | 4/1899 | Hitchcock ............ | B62J 1/005 297/201 |
| 629,956 | A * | 8/1899 | Craig .................. | B62J 1/005 297/201 |
| 635,598 | A * | 10/1899 | Rowe .................. | B62J 1/005 297/201 |
| 872,124 | A | 11/1907 | Hammaren | |
| 4,877,286 | A | 10/1989 | Hobson | |
| 5,823,618 | A * | 10/1998 | Fox .................... | B62J 1/002 297/195.1 |
| 6,209,954 | B1 | 4/2001 | Bombardier | |
| 6,290,291 | B1* | 9/2001 | Kojima ................ | B62J 1/005 297/201 |
| 6,402,236 | B1 | 6/2002 | Yates | |
| 7,178,869 | B2* | 2/2007 | Ljubich ................ | B62J 1/00 297/201 |
| 2003/0038515 | A1 | 2/2003 | Martin et al. | |
| 2004/0066066 | A1* | 4/2004 | Hobson ............... | B62J 1/005 297/201 |

(Continued)

FOREIGN PATENT DOCUMENTS

WO WO 2017048855 A1 * 3/2017 ............. B62J 1/007

*Primary Examiner* — Robert Canfield
(74) *Attorney, Agent, or Firm* — David Meibos; Maywood IP Law

(57) ABSTRACT

An adjustable saddle may include a front mounting bracket with first and second apertures that receive first and second fasteners and a rear mounting bracket with third and fourth apertures that receive third and fourth fasteners. The adjustable saddle may also include first and second saddle half bases that each pivotally attach to the front mounting bracket and slidably translate relative to the rear mounting bracket through first and second arcuate adjustment channels.

20 Claims, 19 Drawing Sheets

(56) References Cited

U.S. PATENT DOCUMENTS

| | | | | |
|---|---|---|---|---|
| 2004/0174051 A1* | 9/2004 | Scholz | ............... | B62J 1/005 |
| | | | | 297/195.1 |
| 2011/0260510 A1* | 10/2011 | Hsu | ............... | B62J 1/08 |
| | | | | 297/201 |
| 2012/0286548 A1* | 11/2012 | Bailie | ............... | B62J 1/002 |
| | | | | 297/201 |
| 2017/0274950 A1* | 9/2017 | Holt | ............... | B62J 1/10 |

* cited by examiner

ADJUSTABLE SADDLE

CROSS-REFERENCE TO RELATED APPLICATIONS

The present application claims the benefit of U.S. Provisional Patent Application Ser. No. 62/218,338, entitled ADJUSTABLE SADDLE, which was filed on Sep. 14, 2015. The foregoing is incorporated by reference as though set forth herein in its entirety.

TECHNICAL FIELD

The present disclosure relates to adjustable saddles. More specifically, the present disclosure relates to an adjustable saddle that supports the ischial tuberosities, ischiopubic rami, and nearby regions of those who use the adjustable saddle.

BACKGROUND

Saddle seats may be used in a variety of applications including but not limited to: chairs, sit/stand chairs, stationary exercise equipment, bicycles, scooters, motorcycles, motorized vehicles, and in various other applications where an individual may desire to assume a seated, or at least partially seated, position. Although the adjustable saddle design disclosed herein is described in the context of bicycle use, it will be understood that the adjustable saddle design disclosed herein may also be used in any other suitable applications where an individual may desire to assume a seated, or at least partially seated, position.

The conventional single platform saddle design is commonly used on bicycles and other equipment throughout the world. These conventional single platform bicycle saddles include a forward protruding horn that exerts pressure on soft tissue, arteries, veins, and associated nerves often resulting in numbness, pain, and/or erectile dysfunction in individuals. Conventional single platform saddles do not provide specific support for the ischial tuberosities, ischiopubic rami, and nearby regions of those who use single platform bicycle saddles. Additionally, conventional single platform saddles do not adjust to variations in the size and shape of ischiopubic rami of different individuals.

Accordingly, adjustable saddle designs that adequately support the ischial tuberosities, ischiopubic rami, and nearby regions of individuals with varying sizes and shapes of ischiopubic rami may result in a more comfortable ride that avoids soft tissue abrasion, numbness, pain, and/or erectile dysfunction.

SUMMARY

In some embodiments, an adjustable saddle may include a front mounting bracket with first and second apertures that receive first and second fasteners and a rear mounting bracket with third and fourth apertures that receive third and fourth fasteners. The adjustable saddle may also include first and second saddle half bases that each pivotally attach to the front mounting bracket and slidably translate relative to the rear mounting bracket via first and second arcuate adjustment channels.

In other embodiments, an adjustable saddle may include first and second upper rails, a front mounting bracket with first and second apertures that receive first and second fasteners, and a rear mounting bracket with third and fourth apertures that receive third and fourth fasteners. The adjustable saddle may also include first and second saddle half bases that each pivotally attach to the front mounting bracket and slidably translate relative to the rear mounting bracket through first and second arcuate adjustment channels.

In yet other embodiments, a method of adjusting an adjustable saddle may include slidably positioning at least one saddle half base relative to a rear mounting bracket. The back end of the at least one saddle half base may have an arcuate adjustment channel that receives a rear fastener. The method may also include engaging the rear fastener to prevent the back end of the at least one saddle half base from sliding relative to the rear mounting bracket.

BRIEF DESCRIPTION OF THE DRAWINGS

Exemplary embodiments of the disclosure will become more fully apparent from the following description and appended claims, taken in conjunction with the accompanying drawings. Understanding that these drawings depict only exemplary embodiments and are, therefore, not to be considered limiting of the disclosure's scope, the exemplary embodiments of the disclosure will be described with additional specificity and detail through use of the accompanying drawings in which:

DETAILED DESCRIPTION

Figure 1:
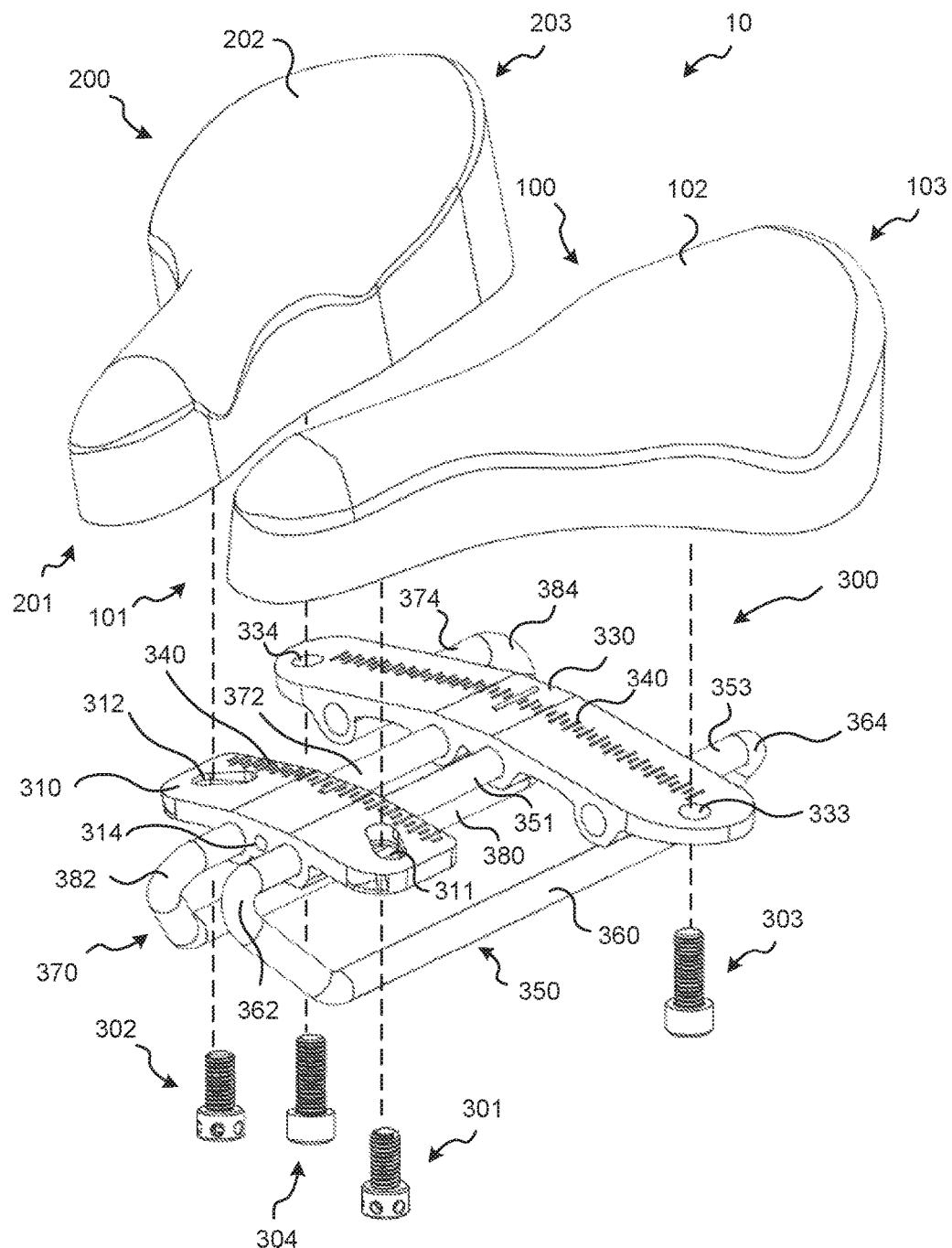
FIG. 1 illustrates an exploded view of an adjustable saddle, according to one embodiment of the present disclosure.

Exemplary embodiments of the present disclosure will be best understood by reference to the drawings, wherein like parts are designated by like numerals throughout. It will be readily understood that the components of the present disclosure, as generally described and illustrated in the Figures herein, could be arranged and designed in a wide variety of different configurations. Thus, the following more detailed description of the embodiments of the apparatus and method, as represented in the figures, is not intended to limit the scope of the present disclosure, as claimed in this or any other application claiming priority to this application, but is merely representative of exemplary embodiments of the present disclosure.

The phrases "connected to," "coupled to," and "in communication with" refer to any form of interaction between two or more entities, including mechanical, electrical, magnetic, electromagnetic, fluid, and thermal interaction. Two components may be functionally coupled to each other even though they are not in direct contact with each other. The term "abutting" refers to items that are in direct physical contact with each other, although the items may not necessarily be attached together. The phrase "fluid communication" refers to two features that are connected such that a fluid within one feature is able to pass into the other feature.

The word "exemplary" is used herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

The adjustable saddles of the present disclosure may provide enhanced support for the ischial tuberosities, ischiopubic rami, and/or nearby regions of individuals. The adjustable saddles may allow an individual to personalize the position of two independently adjustable saddle halves, each saddle half comprising a plurality of surfaces and contours. In this disclosure, the term "half" is used loosely—each of the saddle halves may optionally include more or less than 50% of the surface area that supports the rider. Each saddle half may be pivotally connected at the front end of the adjustable saddle, which may allow for various width adjustments. Each saddle half may be angularly adjustable at the back end of the adjustable saddle to conform to angular variations in male and female ischiopubic rami. Thus, the rider's pelvic bones may ride atop the saddle halves while the soft tissue of the perineum area is untouched between each saddle half. The resulting saddle configuration may prevent problems such as soft tissue abrasions, numbness, pain, and/or erectile dysfunction for men by eliminating pressure and/or compression of the dorsal artery, veins, and nerves. The resulting saddle configuration may also eliminate pressure on women's mons pubis, clitoris, and urethra.

The adjustable saddles of the present disclosure may be used with different riding positions in order to change an angle of the pelvis in relation to the adjustable saddle. For example, given an "upright" riding position, a wider saddle adjustment may be desirable. On the other hand, given a more aggressive riding position (e.g., a "lower," or racing riding position) a narrower saddle adjustment may be more desirable. For upright riding positions, a desired saddle width may be chosen to properly support the sit bones. However, more aggressive riding positions may change the pelvis contact points relative to the saddle such that, as the riding angle becomes more aggressive, the saddle may be narrowed to properly support the pelvic structure. Thus, the front area of the saddle may be selected to be as wide as possible to achieve adequate pelvic support, while being as narrow as possible in order to achieve good pedaling dynamics. In aggressive, or stretched riding positions, the saddle contact point may move from the tip of the sit bones forward along the pubic arch to the pubic bone and, depending on the saddle design, the central perineal area may be used for load bearing for both genders. Women typically have a lower pubic arch which may result in higher pressures when riding in aggressive riding positions with a traditional saddle design. In aggressive riding positions, the manner in which pressure from the pubic bone is distributed to the saddle may be important for comfort and damage prevention to critical nerves and soft tissue. The sit bone and pubic bones tend to come together from their widest points into a "V" shape, such that more aggressive riding positions will generally benefit from a more narrow saddle adjustment.

Thus, in some embodiments, adjustable saddles of the present disclosure provide the ability to adjust both the front and rear section of a saddle independently to adapt to a given sit bone width and riding position to achieve maximum comfort. In some embodiments, the adjustable saddles of the present disclosure can be adjusted as wide as possible to achieve pelvic support as well as sufficiently narrow to achieve good pedaling dynamics. For example, in an aggressive triathlon riding position, both the front and rear sections of the adjustable saddle may be adjusted narrowly and angled inward to support the pelvis and pubic bone to minimize soft tissue contact. Conversely, in an upright position, both the front and rear sections can be adjusted wider and angled outward to support the pelvis and sit bones to minimize soft tissue contact. In addition, the rear portion of the saddle may be adjusted to be higher than the front to angle the adjustable saddle downward front-to-back to reduce and/or eliminate pressure on the perineal area and pelvis arch, improving comfort and safety.

To estimate a proper saddle width, a calculation may be used according to a distance between the centers of the sit bones and a typical riding position (e.g., upright, slightly bent, moderate, stretched, road race, etc.). As one non-limiting example, if a sit bone width for a cyclist is 120 mm, a distance may be added to or subtracted from the 120 mm width measurement depending on a desired riding position. In this example, if the rider's preferred riding position is upright, 20 mm may be added to the base 120 mm, yielding a 140 mm saddle width. If the riding style is aggressive road race triathlon, then 20 mm could be deducted for a 100 mm saddle width measurement. The method may be interpreted slightly differently.

FIGS. 1-7B illustrate various views of an adjustable saddle 10 according to one embodiment of the present disclosure. FIG. 1 illustrates an exploded view of the adjustable saddle 10. FIG. 2A shows an isometric view of the adjustable saddle 10 of FIG. 1 in assembled form and FIG. 2B shows a side view of the adjustable saddle 10 connected to a seat post 400. FIGS. 3A-4B illustrate various top views of the adjustable saddle 10 in different exemplary adjustment configurations and FIGS. 5A-7B and 9B illustrates how the adjustable saddle 10 may generally include rigid bases topped with foam padding which may be further covered with seat covers 102, 202 to protect the foam padding from weathering, abrasion, and general wear. In at least one embodiment, the seat covers 102, 202 may also include cords (not shown) and/or other attachment features configured to couple the seat covers to their respective rigid base, as will be discussed on more detail below.

Figure 2A:
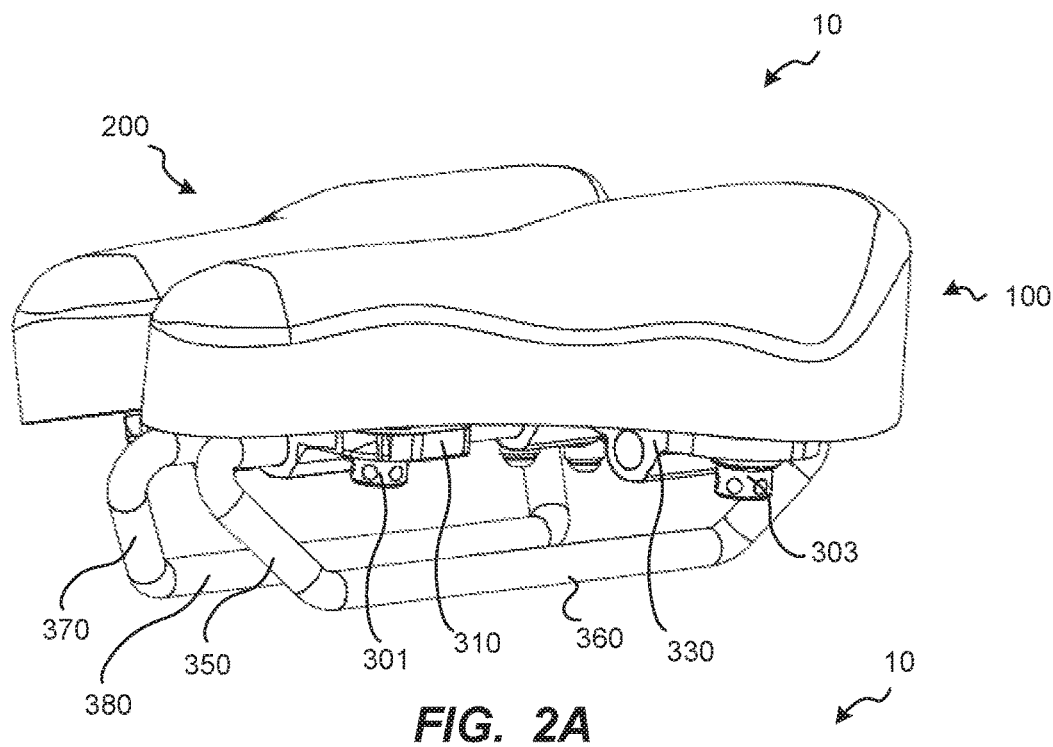
FIG. 2A illustrates an isometric view of the adjustable saddle of FIG. 1 in assembled form.
Figure 2B:
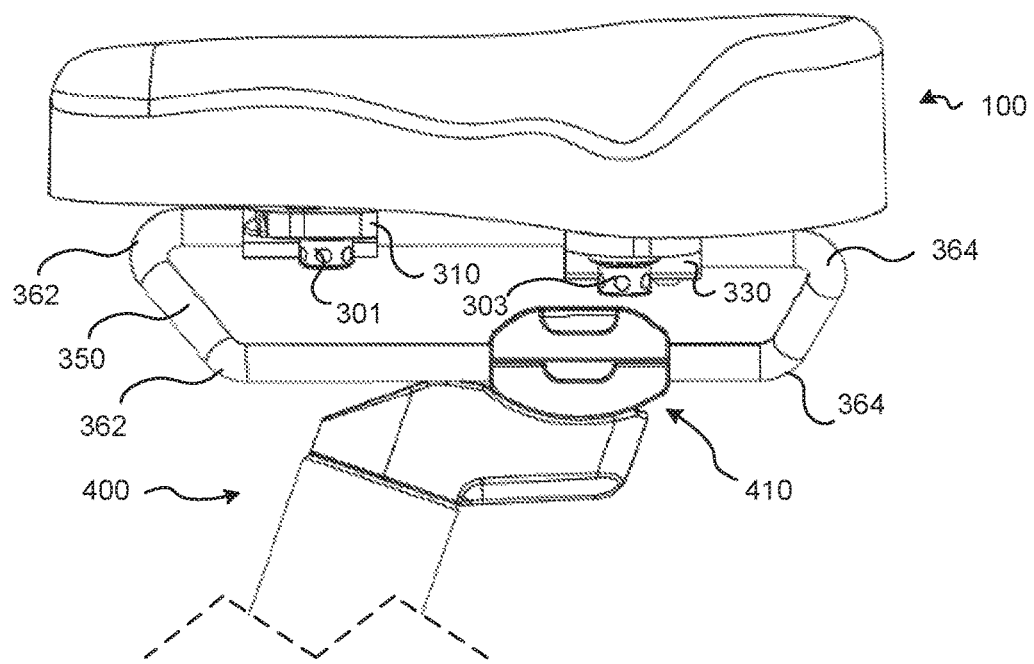
FIG. 2B illustrates a side view of the adjustable saddle of FIG. 2A connected to a seat post.

Continuing generally with FIGS. 1-2B, the adjustable saddle 10 may include a first saddle half 100, a second saddle half 200, and a chassis 300. The first and second saddle halves 100, 200 may be adjustably attached to the chassis 300 via a first fastener 301, a second fastener 302, a third fastener 303, and a fourth fastener 304. The first and second fasteners 301, 302 may also be referred to herein as front fasteners because they attach the front ends 101, 201 of the saddle halves 100, 200 to the chassis 300. Likewise, the third and fourth fasteners 303, 304 may also be referred to herein as rear fasteners because they attach the back ends 103, 203 of the saddle halves 100, 200 to the chassis 300.

The first, second, third, and fourth fasteners 301, 302, 303, 304 may be any suitable fastener style, including but not limited to: threaded screws, bolts, quick release fasteners, and the like. In one embodiment, at least one of the first, second, third, and fourth fasteners 301, 302, 303, 304 may have a cross drilled head to facilitate rotation of the fastener from the side for easier and quicker operation. For example, an individual (not shown) may use a small elongate tool, such as a 2 mm Allen wrench (not shown) to rotate the fastener from the side by inserting one end of the small elongate tool into the cross drilled threaded screws and applying a rotational torque force.

The chassis 300 may generally include a front mounting bracket 310, a rear mounting bracket 330, a first rail 350, and a second rail 370. The front mounting bracket 310 may include a first aperture 311 configured to receive the first fastener 301 to attach the front end 101 of the first saddle half 100 to the front mounting bracket 310, as well as a second aperture 312 configured to receive the second fastener 302 to attach the front end 201 of the second saddle half 200 to the front mounting bracket 310. The front mounting bracket 310 may also include a front attachment aperture 314, as will be described in more detail with reference to FIGS. 7A-9A. Likewise, the rear mounting bracket 330 may include a third aperture 333 configured to receive the third fastener 303 to attach the back end 103 of the first saddle half 100 to the rear mounting bracket 330, as well as a fourth aperture 334 configured to receive the fourth fastener 304 to attach the back end 203 of the second saddle half 200 to the rear mounting bracket 330.

In other embodiments, the front mounting bracket 310 and the rear mounting bracket 330 may be coupled together to form a unified bracket (not shown). The unified bracket may include a front mounting bracket, a rear mounting bracket, and an intermediate piece that couples the front mounting bracket and the rear mounting bracket together. In one embodiment, the front mounting bracket, the rear mounting bracket, and the intermediate piece may be integrally formed together as a single unified bracket. However, in other embodiments, the front mounting bracket, the rear mounting bracket, and the intermediate piece may be configured to detachably couple to each other. In this manner, different intermediate pieces with different lengths, widths, and/or shapes may be used to couple the front mounting bracket to the rear mounting bracket to vary the relative distance between the front mounting bracket and the rear mounting bracket. Moreover, the unified bracket may include any number of apertures that are configured to receive any number of corresponding fasteners to mount the saddle halves 100, 200 to the unified bracket.

In at least one embodiment, the first and second apertures 311, 312 may be angled slots that allow pivotal and translational adjustment of the front ends 101, 201 of the saddle halves 100, 200. However, in other embodiments (not shown), the first and second apertures 311, 312 may be circular shaped holes that allow pivotal adjustment of the front ends 101, 201 of the saddle halves 100, 200. The third and fourth apertures 333, 334 may be circular shaped holes that allow pivotal adjustment of the back ends 103, 203 of the saddle halves 100, 200. However, in other embodiments (not shown), the third and fourth apertures 333, 334, may also be angled slots that allow pivotal and translational adjustment of the back ends 103, 203 of the saddle halves 100, 200. In these embodiments, the addition of angled slots may increase the potential range of motion of the saddle halves 100, 200.

In at least one embodiment, the front mounting bracket 310 and/or the rear mounting bracket 330 may include adjustment markings 340. The adjustment markings 340 may generally indicate the degree to which each saddle half 100, 200 is positionally adjusted with respect to the front mounting bracket 310 and/or the rear mounting bracket 330. In the embodiment shown in FIG. 1, the adjustment markings 340 include simple line markings spaced apart at regular intervals. However, in other embodiments (not shown), the adjustment markings 340 may include numbers or other symbols that indicate various information, such as angular or translational displacement of the saddle halves 100, 200 with respect to the front and rear mounting brackets 310, 330, preferred saddle half 100, 200 positions based on riding style, a rider's personal position preference, etc. The adjustment markings 340 may be formed by any known process including, but not limited to: laser etching, stamping, integral formation during molding/casting, and the like.

In addition to adjustment markings 340, the first rail 350 and/or the second rail 370 may also include additional adjustment markings (not shown) to indicate translational displacement of the chassis 300 with respect to a seat post 400, a seat post mounting bracket 410 (see FIG. 2B), and/or to indicate translational displacement of the front and/or rear mounting brackets 310, 330 with respect to the first and second rails 350, 370. The first rail 350 may have a first lower rail portion 360 and the second rail 370 may have a second lower rail portion 380. The seat post mounting bracket 410 may detachably couple to and/or slidably attach to the first lower rail portion 360 and the second lower rail portion 380 of the first and second rails 350, 370.

The first rail 350 may include at least one first upper rail portion 351 and the second rail 370 may include at least one second upper rail portion 372. The front mounting bracket 310 and/or the rear mounting bracket 330 may be slidably attached to the at least one first upper rail portion 351 of the first rail 350 and the at least one second upper rail portion 372 of the second rail 370. The front and rear mounting brackets 310, 330 may also be held in place along the first and second upper rail portions 351, 372 by any suitable method including simple frictional forces, retainer screws, or the like.

In at least one embodiment, the first rail 350 may include the first upper rail portion 351 and a third upper rail portion 353 and the second rail 370 may include the second upper rail portion 372 and a fourth upper rail portion 374. The front mounting bracket 310 and/or the rear mounting bracket 330 may be slidably attached to the first, second, third, and fourth upper rail portions 351, 372, 353, 374. Likewise, the front and rear mounting brackets 310, 330 may be held in place along the first, second, third, and fourth upper rail portions 351, 372, 353, 374 by any suitable method such as frictional forces, retainer screws, and the like. It is also understood that any or all of the upper rail portions 351, 372, 353, 374 or the lower rail portions 360, 380 may be varied in length to adjust the overall length of the chassis 300 to any desired value.

The first and second rails 350, 370 may include one or more front bends 362, 382 and one or more rear bends 364, 384. The one or more front bends 362, 382 and one or more rear bends 364, 384 may be configured to help absorb mechanical shocks to provide a smoother, more comfortable ride. The one or more front bends 362, 382 and the one or more rear bends 364, 384 may be shaped and/or spaced apart in any manner to vary the clearance, height, width, or angle between any of the upper rail portions 351, 372, 353, 374 and the lower rail portions 360, 380. The one or more front bends 362, 382 and the one or more rear bends 364, 384 may also be shaped and/or spaced apart in any manner to vary the height, forward/backward angle, and side-to-side slope of each saddle half 100, 200. The first and second rails 350, 370 may be formed from any suitable material, or combination of materials including, but not limited to: metals, metal alloys, anodized metals and alloys, steel, titanium, composite materials, carbon fiber, plastic materials, Zytel®, rubber materials, and the like.

Figure 3A:
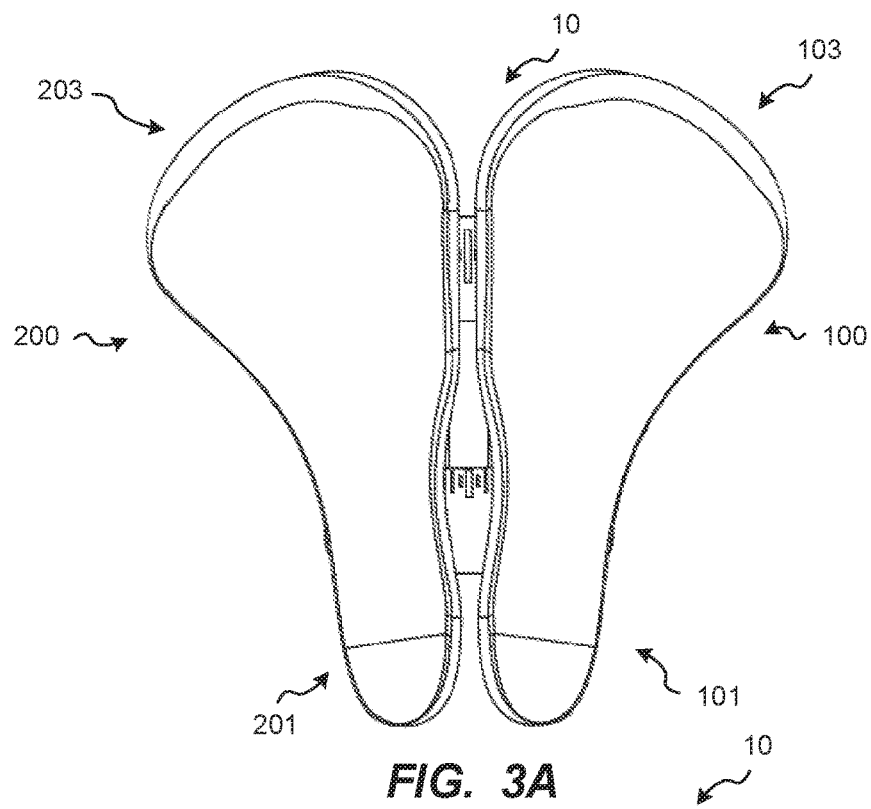
FIGS. 3A-4B show top views of the adjustable saddle of FIG. 2A in various adjustment configurations.
Figure 3B:
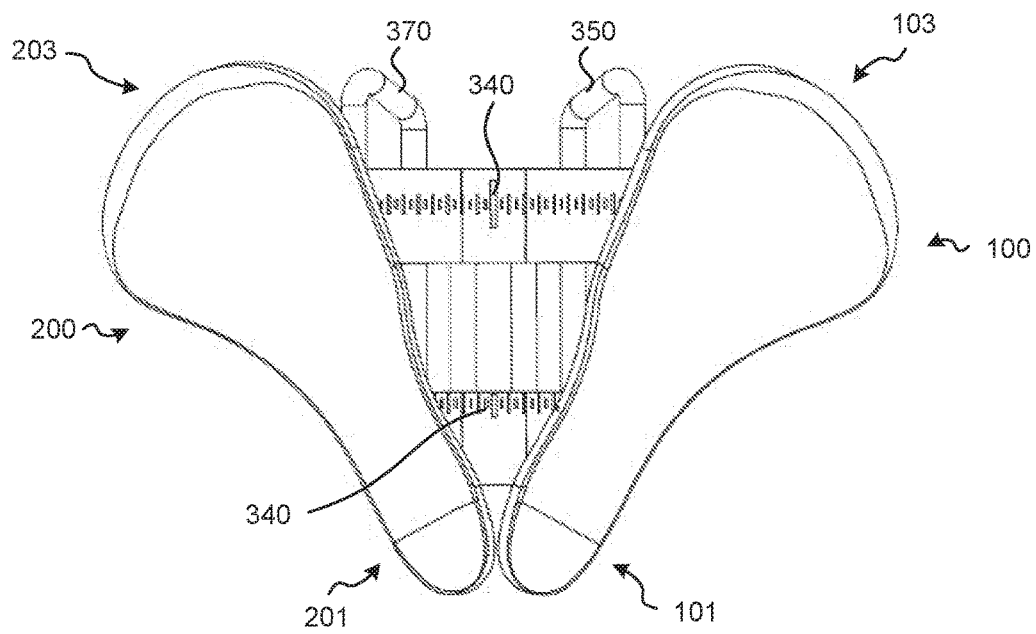
Figure 4A:
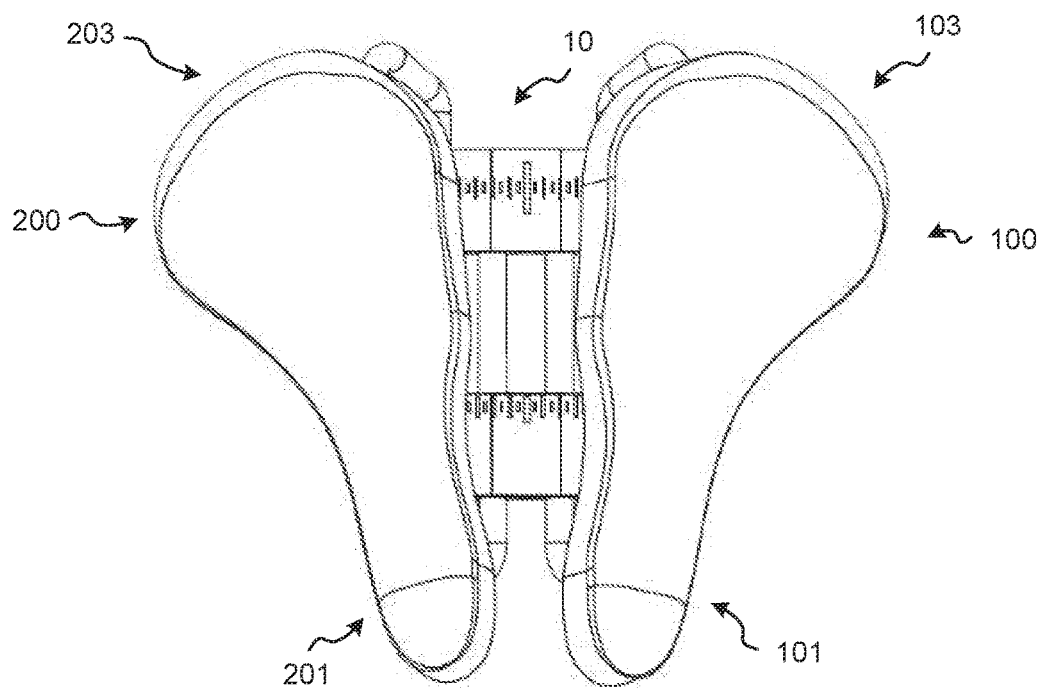
Figure 4B:
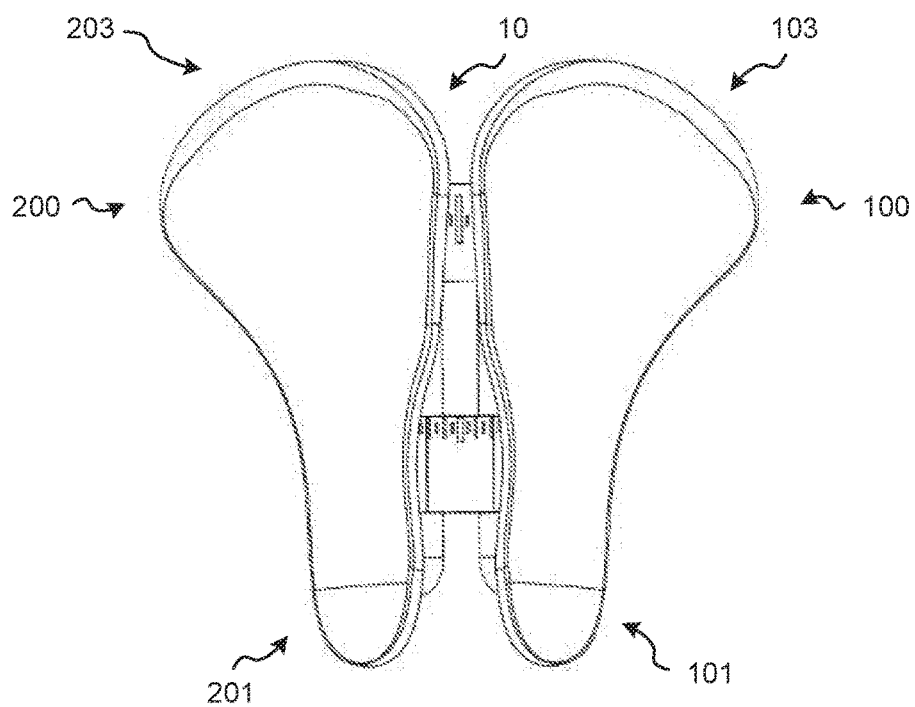
Figure 5A:
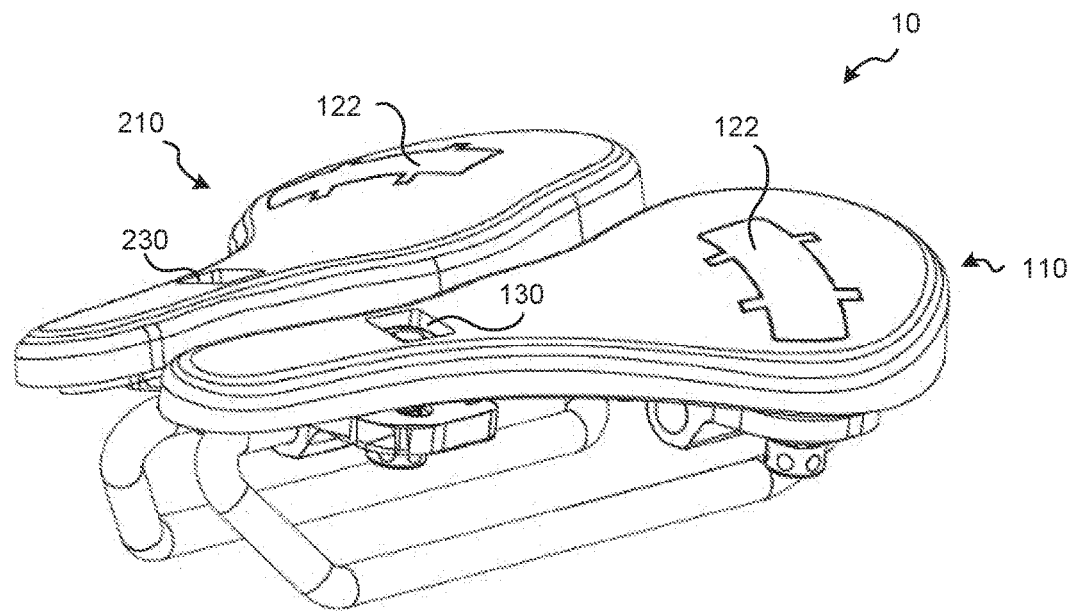
FIG. 5A illustrates an isometric view of the adjustable saddle of FIG. 2A with the foam padding and seat covers removed.
Figure 5B:
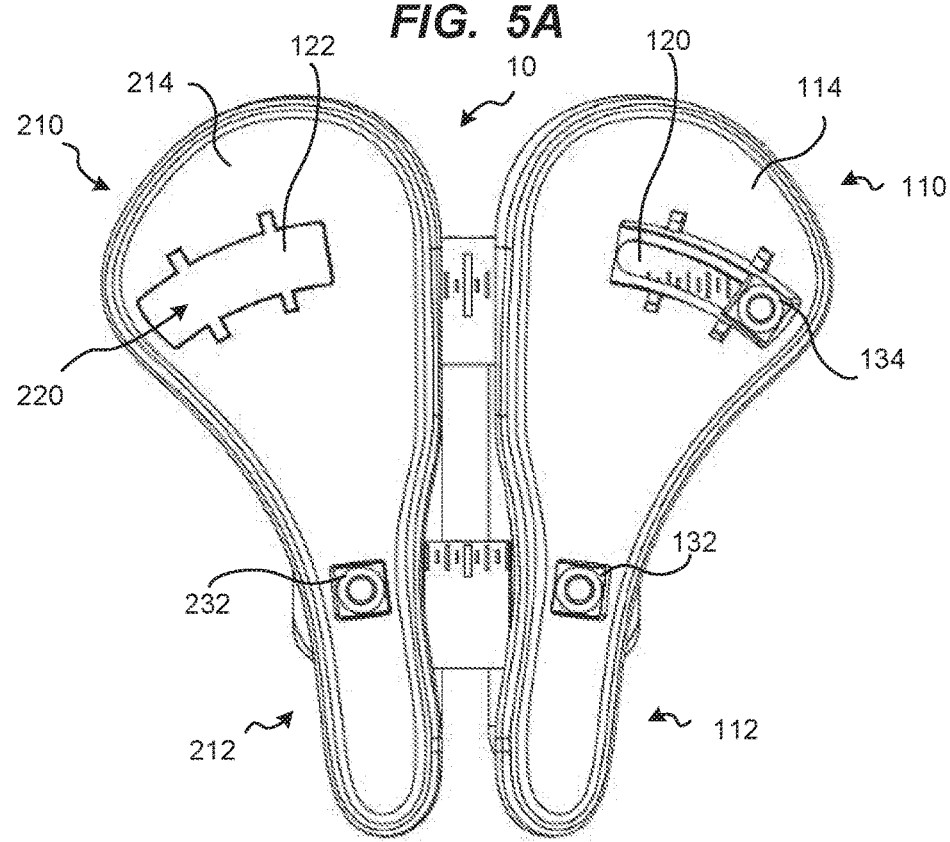
FIG. 5B illustrates a top view of the adjustable saddle of FIG. 5A.

FIGS. 3A-4B illustrate various top views of the adjustable saddle 10 in different exemplary adjustment configurations. FIG. 3A shows the adjustable saddle 10 with the back ends 103, 203 of the saddle halves 100, 200 adjusted close together and the front ends 101, 201 of the saddle halves 100, 200 adjusted close together. FIG. 3B shows the adjustable saddle 10 with the back ends 103, 203 of the saddle halves 100, 200 adjusted far apart from each other and the front ends 101, 201 of the saddle halves 100, 200 adjusted close together. FIG. 4A shows the adjustable saddle 10 with the back ends 103, 203 of the saddle halves 100, 200 adjusted far apart from each other and the front ends 101, 201 of the saddle halves 100, 200 adjusted far apart from each other. FIG. 4B shows the adjustable saddle 10 with the back ends 103, 203 of the saddle halves 100, 200 adjusted close together and the front ends 101, 201 of the saddle halves 100, 200 adjusted far apart from each other. The non-limiting exemplary adjustment configurations shown in FIGS. 3A-4B are for illustration purposes only and it will be understood that the back ends 103, 203 of the saddle halves 100, 200 can assume an infinite number of different positions throughout their adjustment range, and likewise the front ends 101, 201 of the saddle halves 100, 200 can also assume an infinite number of positions throughout their adjustment range. It will also be understood that the size and shape of any of the components of the chassis 300 and the saddle halves 100, 200 may be varied to achieve any saddle half 100, 200 adjustment range/span. For example, the size and shape of the chassis 300 components may be varied to achieve adjustment ranges/spans, including but not limited to: 0-10 cm, 0-15 cm, 0-30 cm, 5-15 cm, 10-20 cm, 15-30 cm, etc.

A wedge tool (not shown) may also be used to help facilitate adjustment of the front ends 101, 201 and the back ends 103, 203 of the saddle halves 100, 200 relative to each other. For example, the wedge tool may have a wedge shape that may be inserted or pressed in between the front ends 101, 201 and/or the back ends 103, 203 of the saddle halves 100, 200. The wedge tool may controllably split apart the saddle halves 100, 200 to achieve a desired spread distance and/or provide one or more reference adjustment angles for the saddle halves 100, 200 during setup of the adjustable saddle 10. In this manner, the wedge tool may be used to help facilitate positional adjustment of the saddle halves 100, 200.

FIGS. 5A-6B show various views of the adjustable saddle 10 with the foam padding and seat covers removed illustrating a first saddle half base 114 and a second saddle half base 214 corresponding to each saddle half 100, 200. The first and second saddle half bases 114, 214 may be formed of one or more rigid materials, including but not limited to: plastics, metals, carbon fiber, Zytel®, composite materials, or the like.

The first and second saddle half bases 114, 214 may include apertures 130, 230 formed in the front ends 112, 212 of the first and second saddle half bases 114, 214. The apertures 130, 230 may be configured to retain and/or couple to suitable retainer nuts 132, 232 placed within the apertures 130, 230. The retainer nuts 132, 232 may be further configured to receive the first and second fasteners 301, 302 by any suitable method, such as complementary threading. In another embodiment (not shown), the apertures 130, 230 formed in the front ends 112, 212 of the first and second saddle half bases 114, 214 may also include angled slots to increase the range of pivotal and/or translational movement of the front ends 112, 212 of the first and second saddle half bases 114, 214.

The first and second saddle half bases 114, 214 may further include a first arcuate adjustment channel 120 and a second arcuate adjustment channel 220 formed in the back ends 110, 210 of the first and second saddle half bases 114, 214. The first arcuate adjustment channel 120 may be configured to receive the third fastener 303 therein. The first saddle half base 114 may be slidably positionable relative to the third fastener 303 positioned within the first arcuate adjustment channel 120 to allow pivotal attachment of the back end 110 of the first saddle half base 114 relative to the rear mounting bracket 330. Likewise, the second arcuate adjustment channel 220 may be configured to receive the fourth fastener 304 therein. The second saddle half base 214 may be slidably positionable relative to the fourth fastener 304 positioned within the second arcuate adjustment channel 220 to allow pivotal attachment of the back end 210 of the second saddle half base 214 to the rear mounting bracket 330.

The first and second arcuate adjustment channels 120, 220 may be configured to retain and/or couple to suitable retainer nuts 134 placed within the arcuate adjustment channels 120, 220. The retainer nuts 134 may be further configured to receive the third and fourth fasteners 303, 304 by any suitable method, such as complementary threading. The first and second arcuate adjustment channels 120, 220 may also be covered with inserts 122 to support and protect foam padding placed on top of the first and second saddle half bases 114, 214.

Figure 6A:
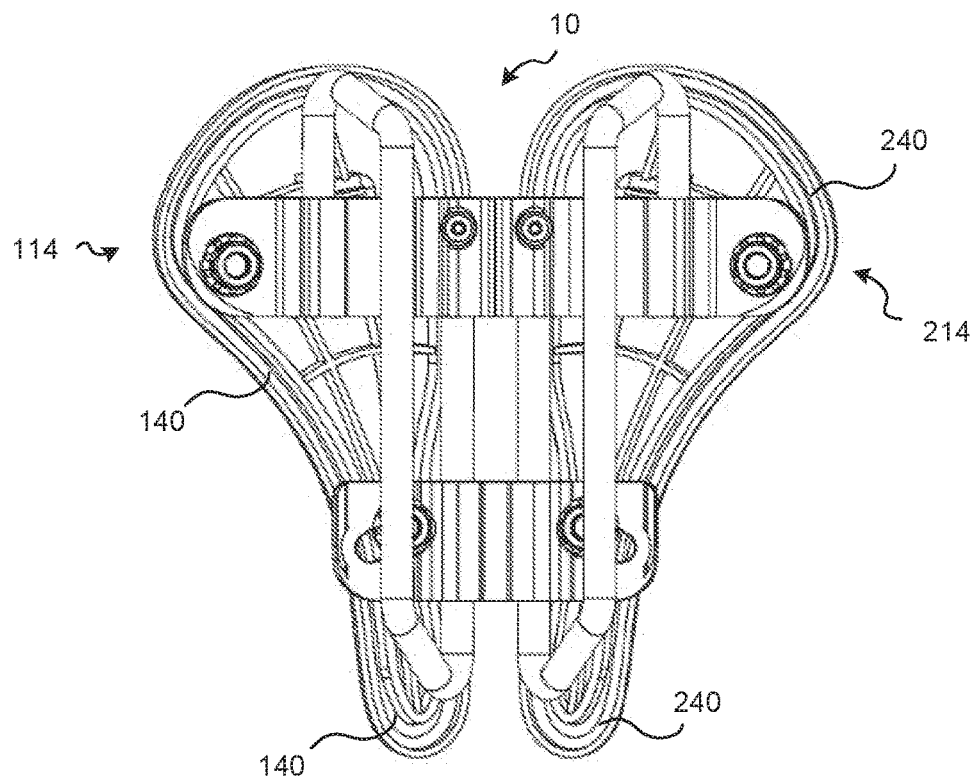
FIG. 6A illustrates a bottom view of the adjustable saddle of FIG. 5A.

FIG. 6A illustrates a bottom view of the adjustable saddle 10 without seat covers or foam padding. The first and second saddle half bases 114, 214 may include grooves 140, 240 formed around the bottom edge of each saddle half base 114, 214 that may be configured to facilitate coupling of the seat covers 102, 202 and/or their cords (not shown) to the first and second saddle half bases 114, 214 to help hold the seat covers 102, 202 in place.

Figure 6B:
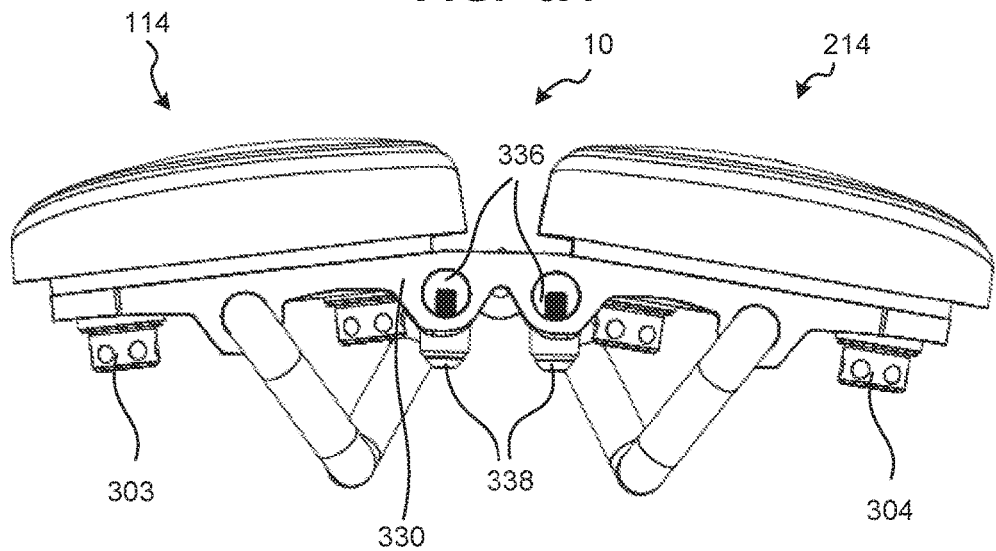
FIG. 6B illustrates a back view of the adjustable saddle of FIG. 5A.

FIG. 6B illustrates a back view of the adjustable saddle 10 without seat covers or foam padding. The rear mounting bracket 330 may include one or more rear attachment apertures 336 configured to receive one or more attachment accessories. The rear mounting bracket 330 may also include one or more attachment fasteners 338 to couple the one or more attachment accessories to the rear mounting bracket 330 and/or couple the rear mounting bracket 330 to the first and second rails 350, 370.

Figure 7A:
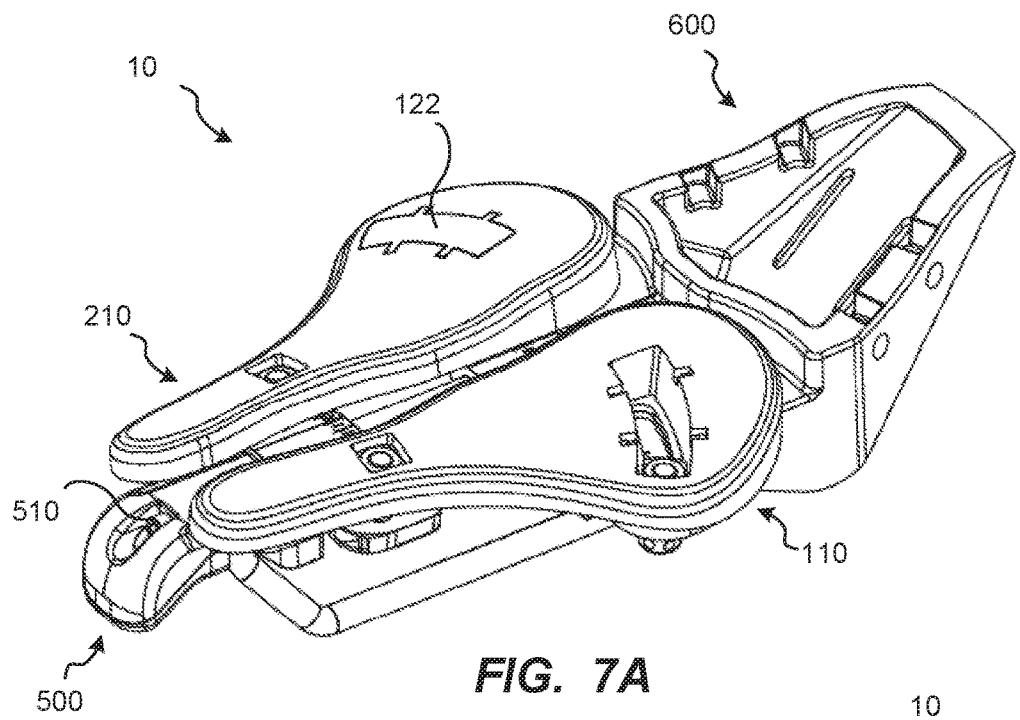
FIG. 7A illustrates an isometric view of the adjustable saddle of FIG. 5A with modular nose and rear wing piece attachments.
Figure 7B:
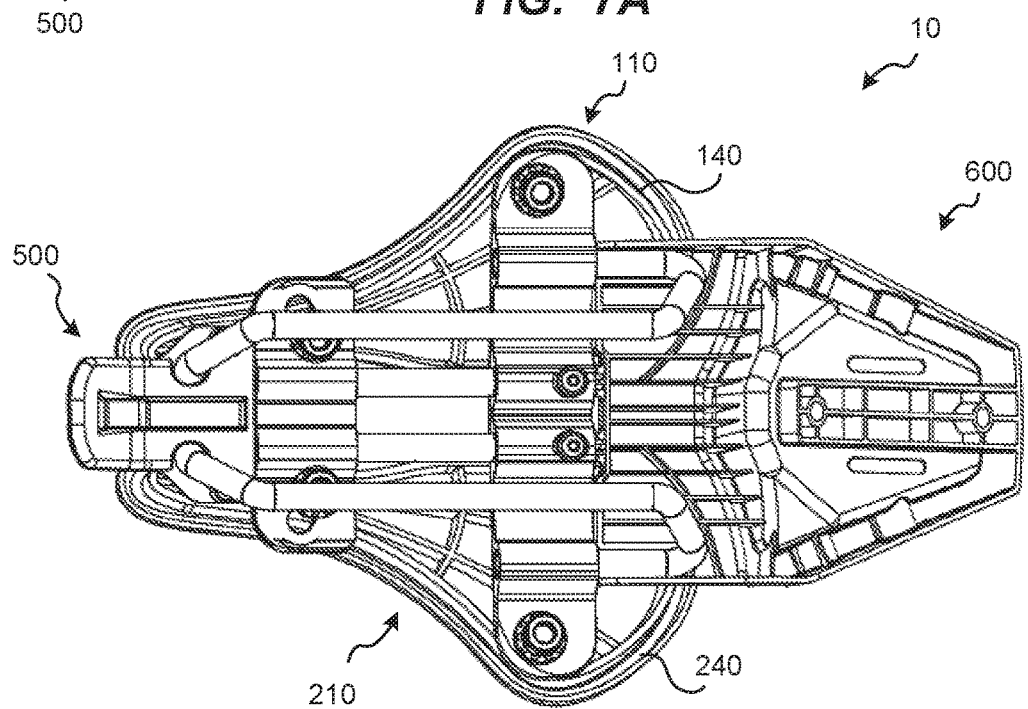
FIG. 7B illustrates a bottom view of the adjustable saddle of FIG. 7A.
Figure 8A:
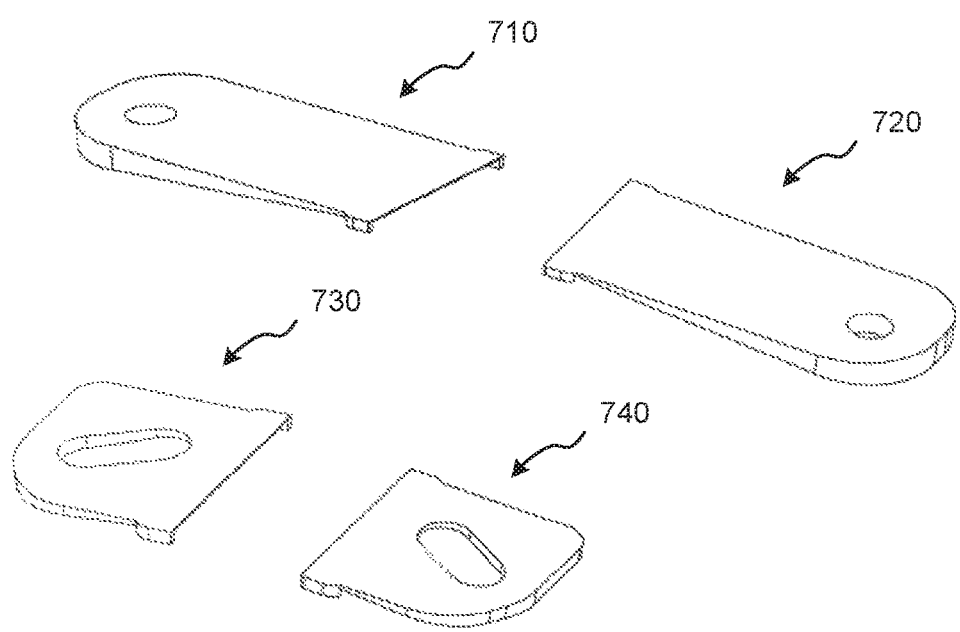
FIG. 8A illustrates an isometric view of example adjustment shims, according to one embodiment of the present disclosure.
Figure 8B:
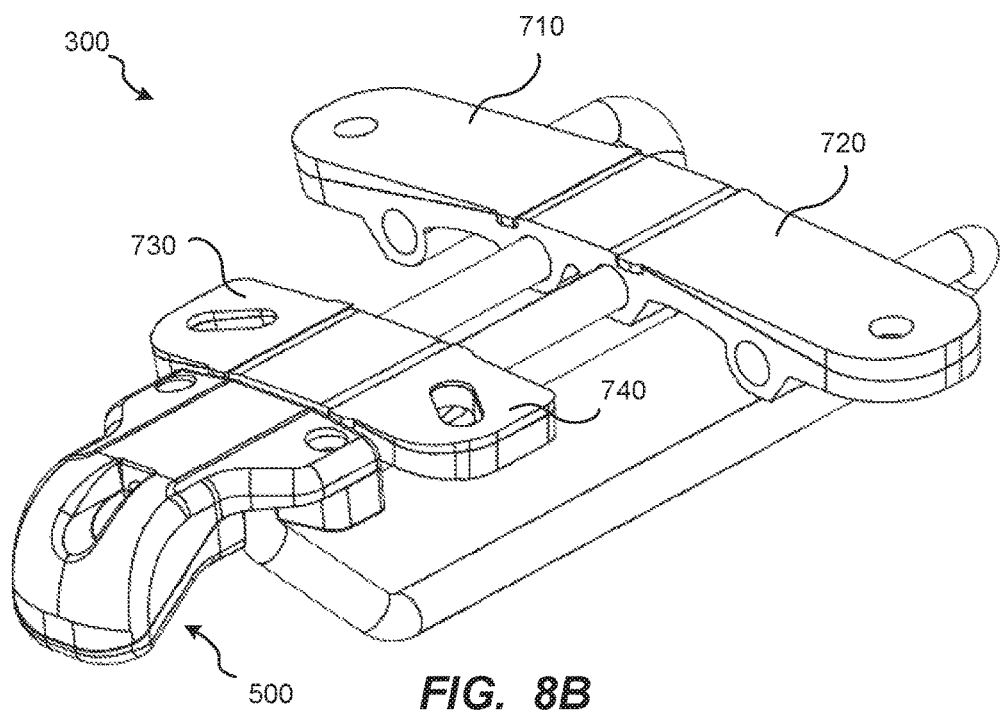
FIG. 8B illustrates an isometric view of a chassis coupled to the adjustment shims of FIG. 8A.

FIGS. 7A and 7B illustrate various views of the adjustable saddle 10 with a modular nose piece 500 attached to the front mounting bracket 310 and a rear tailpiece 600 attached to the rear mounting bracket 330. The modular nose piece 500 may act as a transition hook to hold a bike on a rail and/or facilitate transitions between different triathlon events. The modular nose piece 500 may be attached to the front mounting bracket 310 via a nose attachment screw 510 that may be threaded into the attachment aperture 314 of the front mounting bracket 310 (see FIG. 1). The rear tailpiece 600 may include various mounting brackets for additional attachments, including but not limited to: water bottle brackets, water bottle cages, $CO_2$ cartridges, toolkits, spare parts, and the like.

FIGS. 8A-9A illustrate various adjustment shims 710, 720, 730, 740 that may be used in conjunction with any adjustable saddle of the present disclosure to adjust a height, slope, flatness, and/or angle of each saddle half base 114, 214. For example, at least one adjustment shim 710, 720, 730, 740 may be placed between at least one of the front and rear mounting brackets 310, 330 and at least one of the first and second saddle half bases 114, 214 to adjust the height, slope, flatness, and/or angle associated with the at least one of the first and second saddle half bases 114, 214. In this manner, adjustment shims 710, 720, 730, 740 of varying angles may be used to adjust the side-to-side angle, or "flatness," of each saddle half base 114, 214. The adjustment shims 710, 720, 730, 740 may remain installed on the adjustable saddle to raise the front or the back of the adjustable saddle in place of, or in addition to, the use of a seat post mount to raise the front or the back of the adjustable saddle. The length of any fasteners used to fasten the saddle half bases 114, 214 to the chassis may also be adjusted to accommodate a particular thickness of a given adjustment shim 710, 720, 730, 740. In at least one embodiment, adjustable screws (not shown) may also be utilized to provide additional angle adjustments between each saddle half base 114, 214 and the front and/or rear mounting brackets 310, 330 that each saddle half base 114, 214 rests on.

Moreover, any number or combination of adjustment shims 710, 720, 730, 740 may be used in any desired configuration to individually adjust the height, forward/backward angle, flatness, and side-to-side slope of each saddle half base 114, 214. In this manner, an individual may achieve any desired height, forward/backward angle, flatness, and side-to-side slope for each saddle half base 114, 214 and thereby achieve complete customization of a given adjustable saddle. Moreover, the width, length, slope, flatness, and shape of the front and rear mounting brackets 310, 330 themselves may also be varied to individually adjust the height, forward/backward angle, flatness, and side-to-side slope of each saddle half base 114, 214.

Figure 9A:
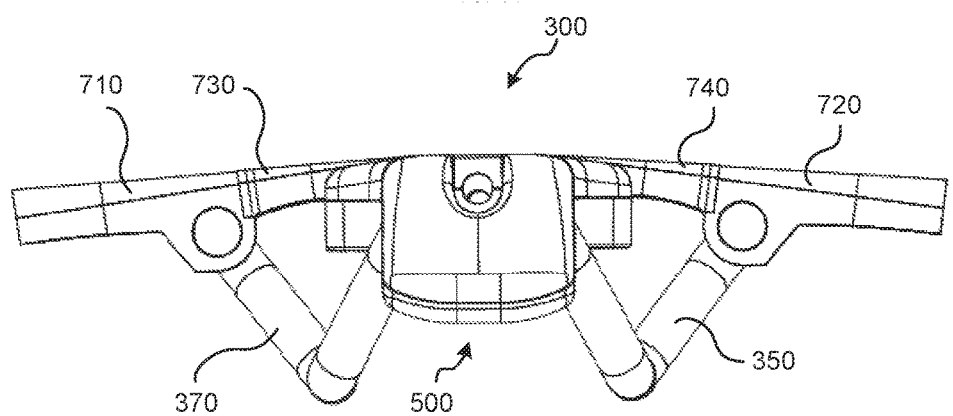
FIG. 9A illustrates a front view of the chassis of FIG. 8B.
Figure 9B:
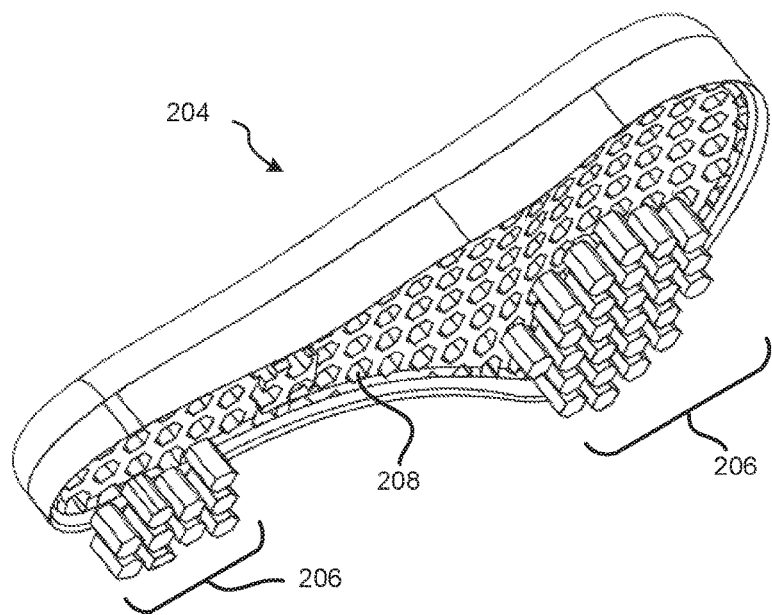
FIG. 9B illustrates an isometric view of example foam padding, according to one embodiment of the present disclosure.

FIG. 9B illustrates example foam padding 204 that may be used with any adjustable saddle of the present disclosure. The foam padding 204 material may be made to specification to achieve any desired firmness or softness. The foam padding 204 may also be varied in shape and thickness. In the embodiment shown in FIG. 9B, the foam padding 204 may include a plurality of honeycomb shaped apertures 208 and corresponding honeycomb shaped foam plugs 206. The firmness of the foam padding 204 may be fine-tuned by inserting the honeycomb shaped foam plugs 206 into the honeycomb shaped apertures 208 to achieve extra firmness in selected areas. This may allow a rider to fine tune the foam padding 204 based on advanced pressure mapping techniques to achieve a customized firmness/softness profile, avoid "hot-spots," and reduce weight by only utilizing the honeycomb shaped foam plugs 206 where they are needed.

In other embodiments (not shown), the foam padding 204 may include any suitable shape of foam plugs 206 and/or apertures 208 including, but not be limited to: square, rectangular, round, circular, triangular, oval, hexagonal, octagonal, block, box, spherical, cylindrical, pyramidal, trapezoidal, and the like.

It will be understood that the adjustable saddles described herein may be completely modular in nature. Thus, any of the individual parts, components, or accessories described herein may be available in a number of different colors, sizes, shapes, materials, etc., and may be mixed and matched in many different combinations to suit a particular preference. For example, differently shaped saddle half bases 114, 214 (not shown) may include a higher surface on their the back ends 110, 210 to accommodate individuals with medical conditions or individual who prefer a higher back surface to help keep their sit bones from sliding backward in the adjustable saddle 10 as they ride. In some embodiments, kits may be sold to entities (e.g., bike shops) which may include a plurality of different parts, components, and accessories of various different colors, sizes, shapes, materials, etc. The entity may utilize the components in the kit to build customized adjustable saddles according to the preferences of a given individual. Moreover, each saddle half 100, 200 may be quickly removed and swapped out for a different saddle while the chassis 300 remains mounted to the seat post 400. This allows the individual to quickly install new saddle halves 100, 200 with different colors, sizes, shapes, materials, etc.

Figure 10:
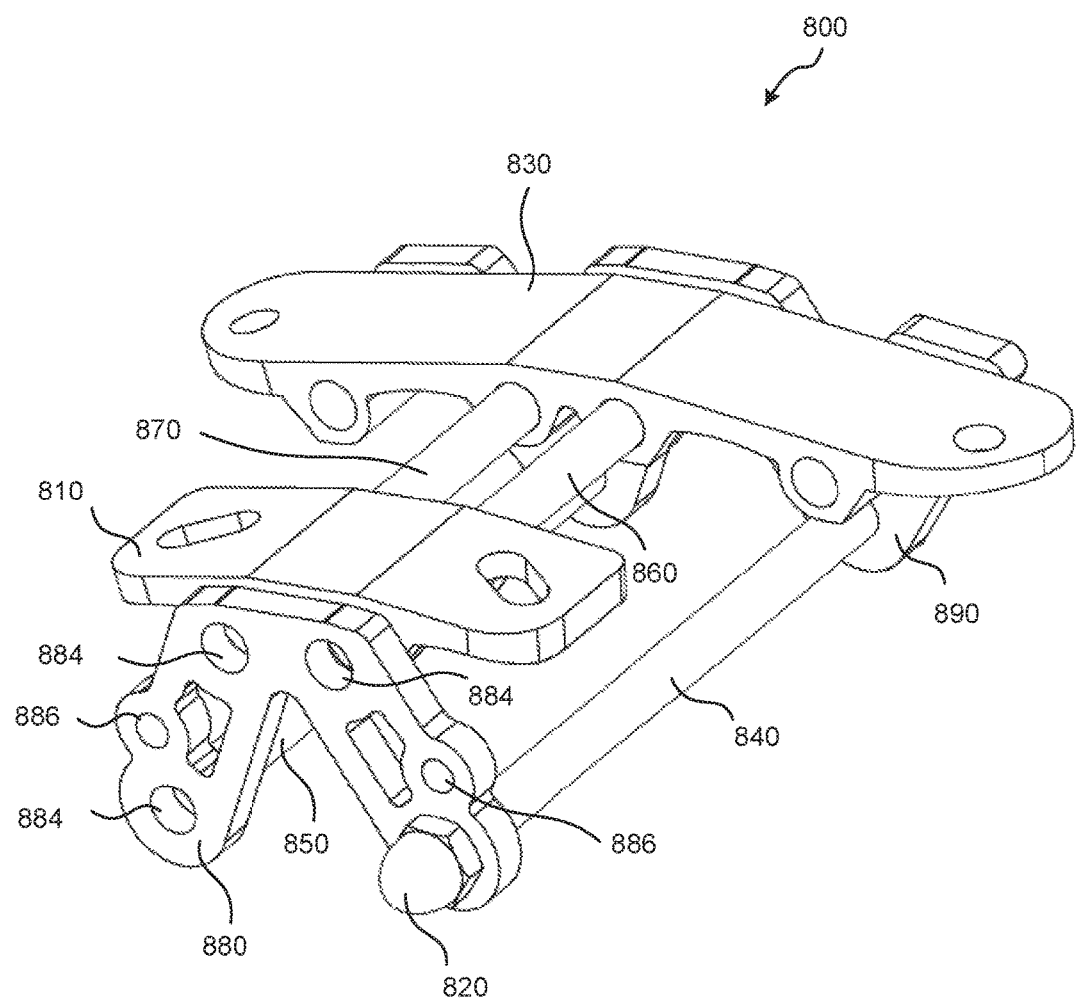
FIG. 10 illustrates an isometric view of a chassis, according to another embodiment of the present disclosure.
Figure 11A:
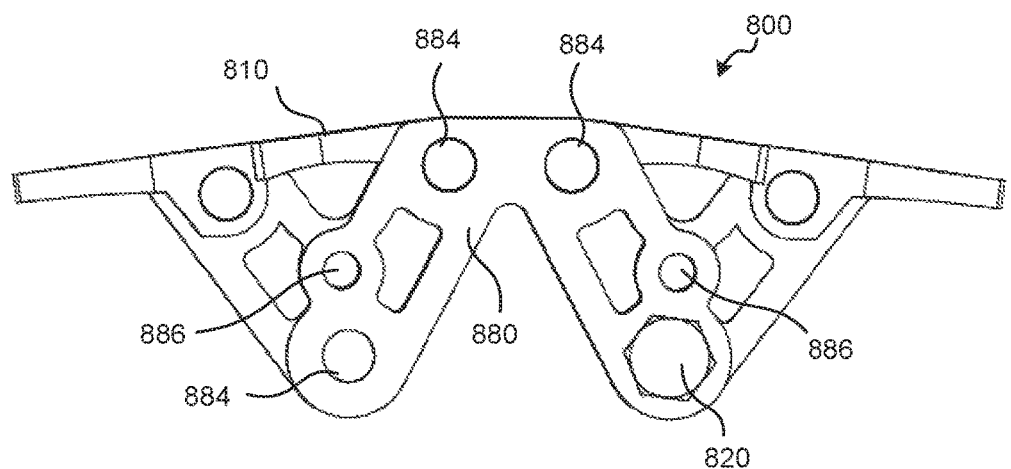
FIG. 11A illustrates a front view of the chassis of FIG. 10.
Figure 11B:
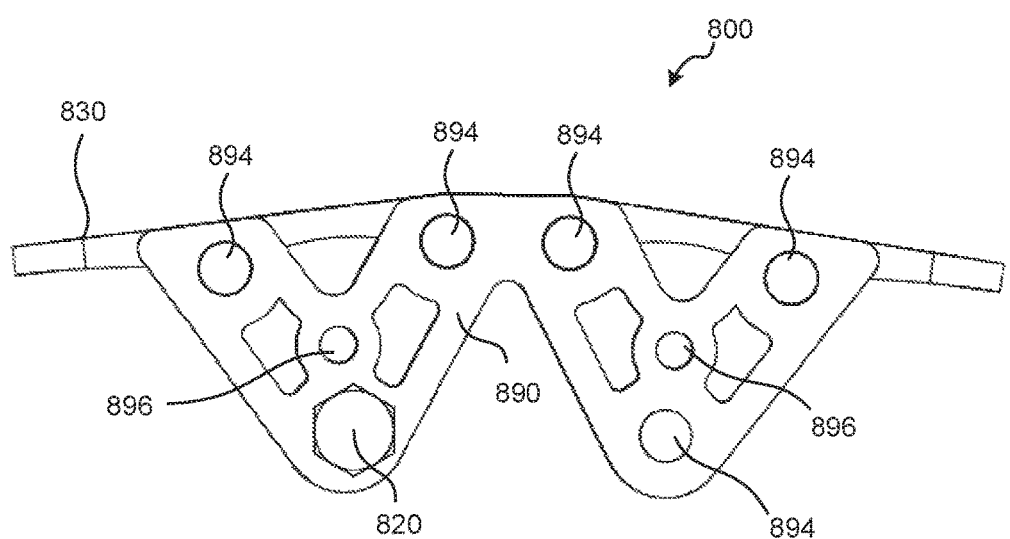
FIG. 11B illustrates a back view of the chassis of FIG. 10.

FIGS. 10-11B illustrate various views of a chassis 800, according to another embodiment of the present disclosure. The chassis 800 may generally include a front mounting bracket 810, a rear mounting bracket 830, a first lower rail 840, a second lower rail 850, a first upper rail 860, a second upper rail 870, a front rail bracket 880, and a back rail bracket 890. The front mounting bracket 810 and/or the rear mounting bracket 830 may be slidably attached to the first and second upper rails 860, 870 and/or held in place along the first and second upper rails 860, 870 by any suitable method such as frictional forces, retainer screws, and the like.

The first and second upper and lower rails 840, 850, 860, 870, front and back rail brackets 880, 890, and front and rear mounting brackets 810, 830 may be formed from any suitable material, or combination of materials including, but not limited to: metals, metal alloys, anodized metals and alloys, steel, titanium, composite materials, carbon fiber, plastic materials, Zytel®, rubber materials, and the like.

In the embodiment shown in FIGS. 10-11B, the first and second upper rails 860, 870 and the first and second lower rails 840, 850 may generally be straight and have cylindrical shapes. However, in other embodiments the first and second upper and lower rails 840, 850, 860, 870 may be curved and/or have non-cylindrical shapes. Any or all of the first and second upper and lower rails 840, 850, 860, 870 may be varied in length to adjust the overall length of the chassis 800 to achieve any desired value. Moreover, the first and second upper and lower rails 840, 850, 860, 870 may be spaced apart from each other and/or angled with respect to each other in any manner to vary the height, forward/backward angle, and side-to-side slope of each saddle half.

The first and second upper and lower rails 840, 850, 860, 870 may be coupled to the front and back rail brackets 880, 890 by any suitable means including, but not limited to: integral formation, adhesive bonding (e.g., epoxy adhesives), detachable fasteners, quick release fasteners, and the like. In the embodiment shown in FIGS. 10-11B, the first and second upper and lower rails 840, 850, 860, 870 may be detachably coupled to the front and back rail brackets 880, 890 by one or more fasteners 820. In at least one embodiment, the one or more fasteners 820 may be mechanically threaded nuts that engage complementary threading that is coupled to, or formed on, the ends of the first and second upper and lower rails 840, 850, 860, 870 and which protrudes through one or more front rail apertures 884 formed in the front rail bracket 880 and one or more back rail apertures 894 formed in the back rail bracket 890.

The front rail bracket 880 may also include additional apertures, such as front mounting apertures 886. Likewise, the back rail bracket 890 may also include additional apertures, such as back mounting apertures 896. The front and back mounting apertures 886, 896 may be configured to receive one or more attachment accessories, as previously described herein.

The one or more front and back rail apertures 884, 894 may be spaced apart from each other and/or angled with respect to each other in any manner to vary the height, forward/backward angle, and side-to-side slope of each saddle half and/or individually vary the height, forward/backward angle, and side-to-side angle of each of each of the first and second upper and lower rails 840, 850, 860, 870.

Figure 12:
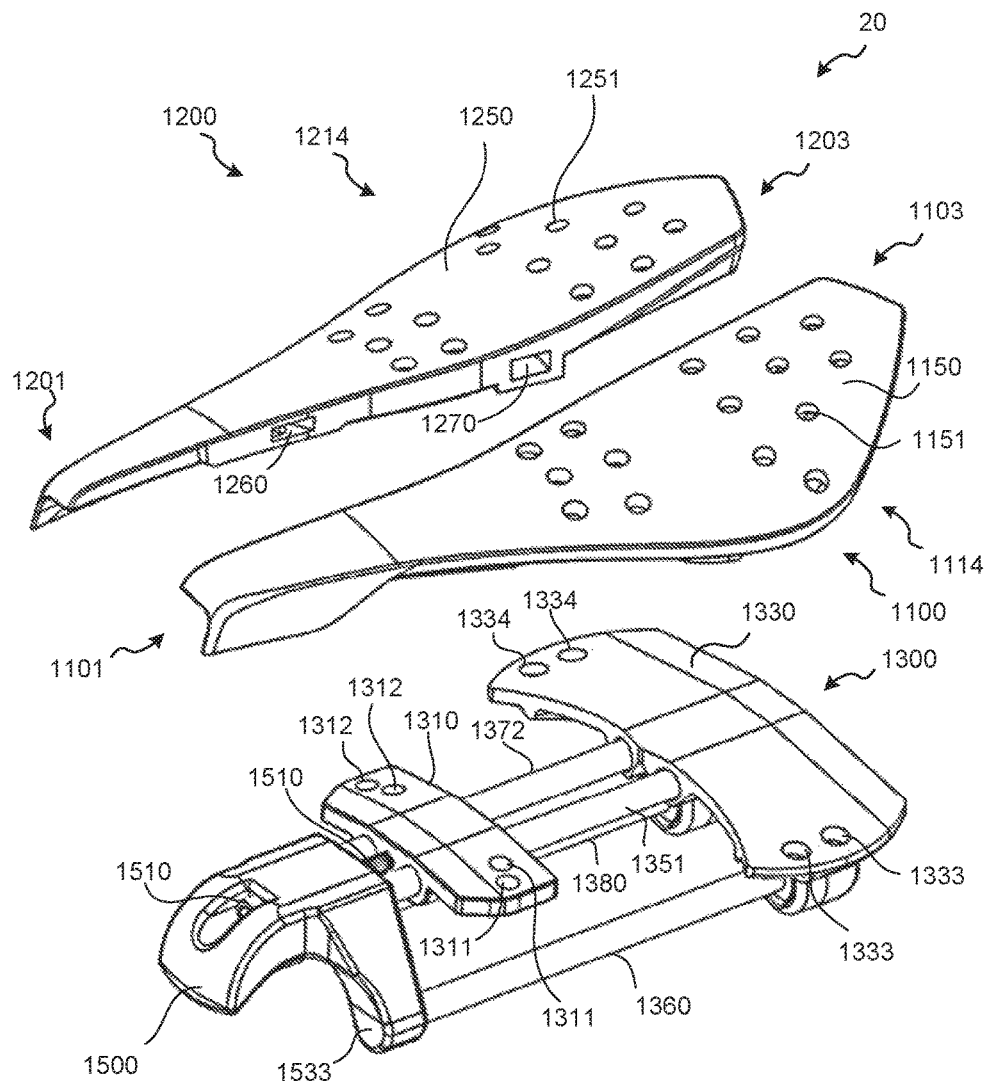
FIG. 12 illustrates an exploded view of an adjustable saddle including a chassis and two saddle half bases, according to another embodiment of the present disclosure.

FIG. 12 illustrates an exploded view of an adjustable saddle 20, according to another embodiment of the present disclosure. The adjustable saddle 20 may generally include a first saddle half 1100 including a first saddle half base 1114, a second saddle half 1200 including a second saddle half base 1214, and a chassis 1300. The first and second saddle half bases 1114, 1214 may be further covered in foam padding (not shown) and the foam padding may also be further covered with suitable seat covers (not shown) to help protect the foam padding from weathering, abrasion, and general wear. In at least one embodiment, the foam padding may be coupled to the first and second saddle half bases 1114, 1214 with a suitable adhesive and the seat covers may also be coupled to the foam padding with a suitable adhesive, as will be discussed in more detail below.

The first and second saddle half bases 1114, 1214 may be adjustably attached to the chassis 1300 via a first fastener, a second fastener, a third fastener, and a fourth fastener (not shown) in similar fashion to the adjustable saddle 10 shown in FIG. 1 and discussed previously. The first and second fasteners may be referred to as front fasteners that are configured to attach the front ends 1101, 1201 of the saddle halves 1100, 1200 to the chassis 1300. Likewise, the third and fourth fasteners may be referred to as rear fasteners configured to attach the back ends 1103, 1203 of the saddle halves 1100, 1200 to the chassis 1300.

Figure 13A:
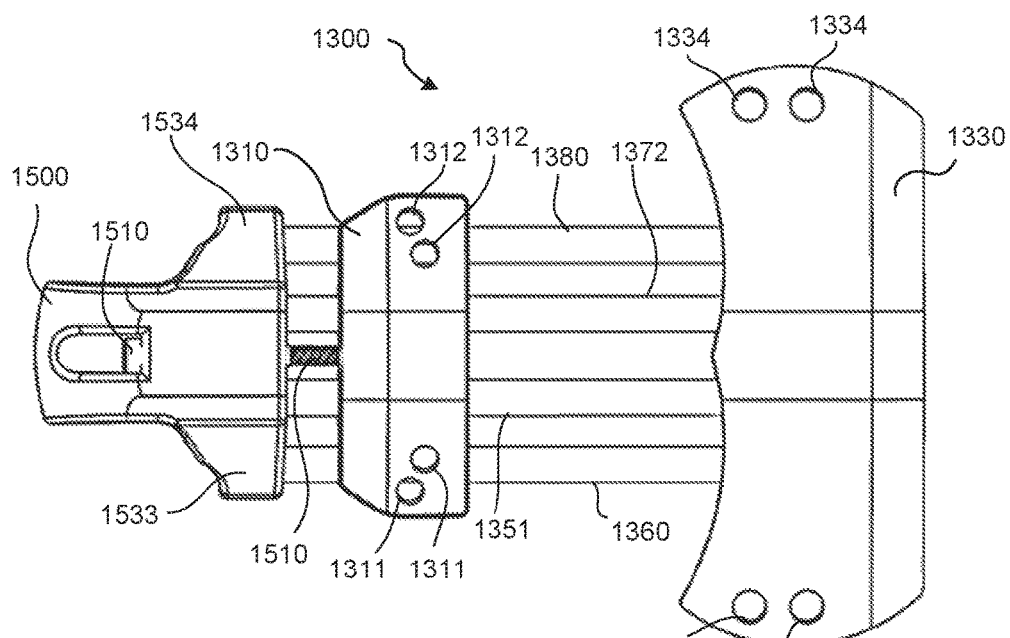
FIG. 13A illustrates a top view of the chassis shown in FIG. 12.
Figure 13B:
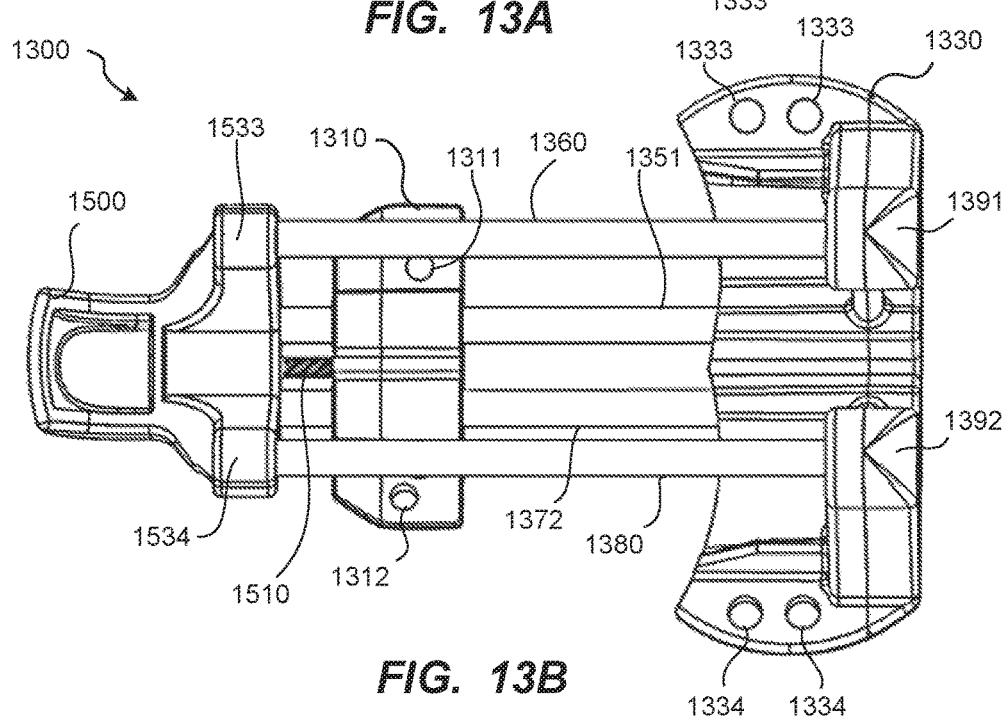
FIG. 13B illustrates a bottom view of the chassis shown in FIG. 12.
Figure 13C:
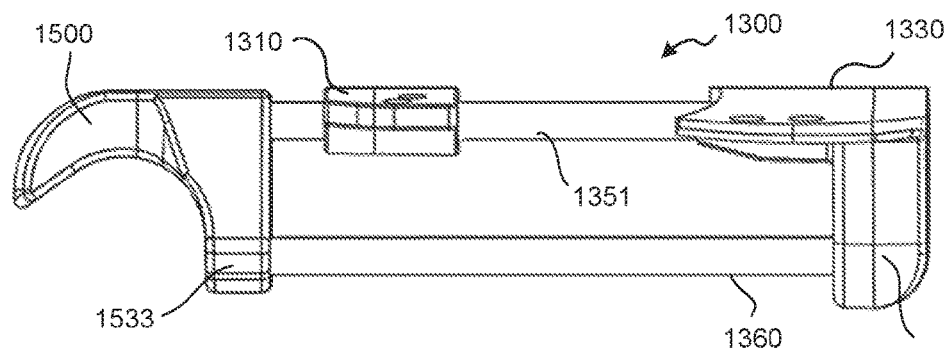
FIG. 13C illustrates a side view of the chassis shown in FIG. 12.

FIGS. 13A-13C illustrate various views of the chassis 1300 shown in FIG. 12. The chassis 1300 may generally include a nose piece 1500, a nose piece adjustment screw 1510, a front mounting bracket 1310, a rear mounting bracket 1330, a first lower rail 1360, a second lower rail 1380, a first upper rail 1351, and a second upper rail 1372.

The nose piece 1500, nose piece adjustment screw 1510, front mounting bracket 1310, rear mounting bracket 1330, first lower rail 1360, second lower rail 1380, first upper rail 1351, and second upper rail 1372 may be formed from any suitable material, or combination of materials including, but not limited to: metals, metal alloys, anodized metals and alloys, steel, titanium, composite materials, carbon fiber, plastic materials, Zytel®, rubber materials, and the like.

In at least one embodiment, the first and second upper and lower rails 1351, 1360, 1372, 1380 may generally be straight and have cylindrical shapes. However, in other embodiments (not shown) the first and second upper and lower rails 1351, 1360, 1372, 1380 may be curved and/or have non-cylindrical shapes. Any or all of the first and second upper and lower rails 1351, 1360, 1372, 1380 may be varied in length to adjust the overall length of the chassis 1300 to achieve any desired value. Moreover, the first and second upper and lower rails 1351, 1360, 1372, 1380 may be spaced apart from each other and/or angled with respect to each other in any manner to vary the height, forward/backward angle, and side-to-side slope of each saddle half. The first and second upper and lower rails 1351, 1360, 1372, 1380 may be coupled to the nose piece 1500 and the rear mounting bracket 1330 by any suitable means including, but not limited to: friction fit, integral formation, adhesive bonding (e.g., epoxy adhesives), detachable fasteners, quick release fasteners, and the like.

The front mounting bracket 1310 may include first apertures 1311 configured to receive the first fastener (not shown) to attach the front end 1101 of the first saddle half 1100 to the front mounting bracket 1310, as well as second apertures 1312 configured to receive the second fastener (not shown) to attach the front end 1201 of the second saddle half 1200 to the front mounting bracket 1310. Likewise, the rear mounting bracket 1330 may include third apertures 1333 configured to receive the third fastener (not shown) to attach the back end 1103 of the first saddle half 1100 to the rear mounting bracket 1330, as well as fourth apertures 1334 configured to receive the fourth fastener (not shown) to attach the back end 1203 of the second saddle half 1200 to the rear mounting bracket 1330.

The front mounting bracket 1310 may be slidably adjustable along the length of the first upper rail 1351 and the second upper rail 1372. This may be accomplished by turning the nose piece adjustment screw 1510 clockwise and/or counter clockwise to adjust the translational position of the front mounting bracket 1310 relative to the rear mounting bracket 1330 along the lengths of the first upper rail 1351 and the second upper rail 1372. In this manner, any distance between the front mounting bracket 1310 and the rear mounting bracket 1330 may be achieved. However, in other embodiments (not shown), the nose piece 1500 and front mounting bracket 1310 may be integrated together in a single piece such that the front mounting bracket 1310 may not be configured to move relative to the nose piece 1500. Moreover, in other embodiments (not shown), the nose piece 1500, the front mounting bracket 1310, and/or the rear mounting bracket 1330 may be integrally formed together as a single unified bracket.

In the embodiment shown in FIGS. 12-13C, the first and second apertures 1311, 1312 may be angled relative to each other to allow pivotal and/or translational adjustment of the front ends 1101, 1201 of the saddle halves 1100, 1200. However, it will be understood that in other embodiments contemplated herein, the first and second apertures 1311, 1312 may not be angled relative to each other and any number of first and second apertures 1311, 1312 may be used. Likewise, in the embodiment shown in FIGS. 12-13C, the third and fourth apertures 1333, 1334 may or may not be angled relative to each other to allow pivotal and/or translational adjustment of the back ends 1103, 1203 of the saddle halves 1100, 1200. Furthermore, in yet other embodiments (not shown), the third and fourth apertures 1333, 1334, may also comprise angled slots to allow pivotal and translational adjustment of the back ends 1103, 1203 of the saddle halves 1100, 1200 to increase the potential range of motion of the saddle halves 1100, 1200.

Figure 14A:
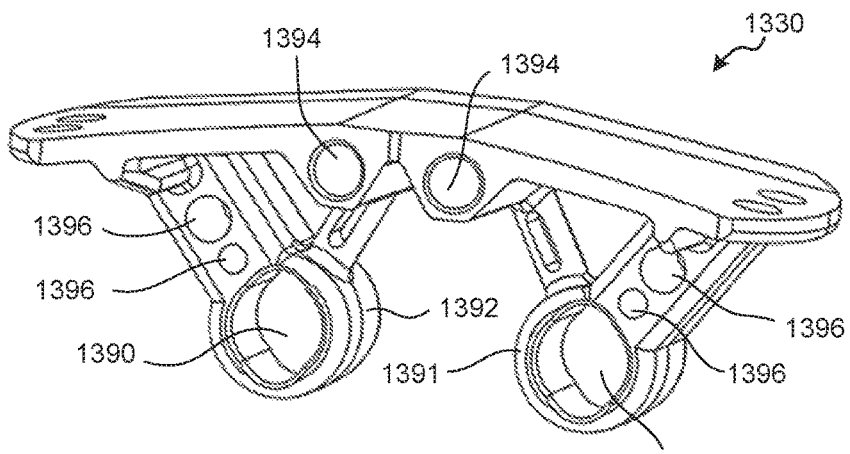
FIG. 14A illustrates an isometric front view of an example rear mounting bracket that may be used with the chassis shown in FIGS. 13A-13C.
Figure 14B:
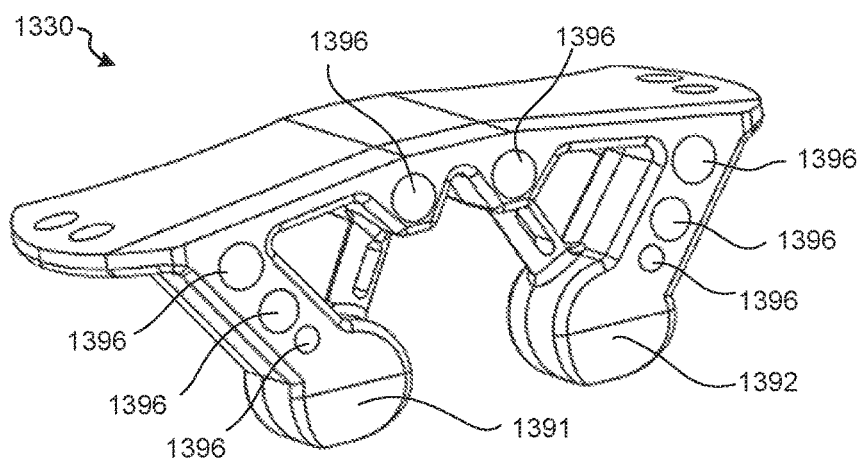
FIG. 14B illustrates an isometric rear view of the rear mounting bracket shown in FIG. 14A.

FIGS. 14A and 14B illustrate isometric front and back views of the rear mounting bracket 1330. The rear mounting bracket 1330 may include upper rail apertures 1394 configured to receive the first and second upper rails 1351, 1372 there in, as well as a first lower rail housing 1391 and a second lower rail housing 1392.

Figure 15:
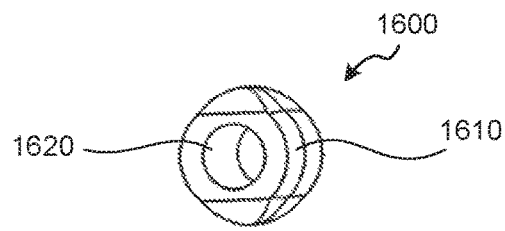
FIG. 15 illustrates an isometric view of an example flexible member that may be used with the rear mounting bracket shown in FIGS. 14A and 14B.

In at least one embodiment, each of the first lower rail housing 1391 and the second lower rail housing 1392 may further include flexible member chambers 1390 each configured to receive a first flexible member 1600 and a second flexible member 1600 therein (see FIG. 15). The flexible members 1600 may include an outer surface 1610 configured to engage an inner surface of the first or second lower rail housings 1391, 1392 as well as an aperture 1620 configured to engage one of the first and second lower rails 1360, 1380 therein. In at least one embodiment, the flexible members 1600 may be made of a flexible material (e.g., thermoplastic elastomer) which may provide shock absorption characteristics to the adjustable saddle 20, isolate the adjustable saddle 20 from road vibrations, and/or provide a "side-to-side" pivot motion of the adjustable saddle 20 as the rider pedals the bicycle. However, it will be understood that in other embodiments, the flexible members 1600 may also be made of rigid materials, so as to preclude shock absorption, isolation from road vibrations, and/or a "side-to-side" pivot/rocking motion as the rider pedals the bicycle. It will also be understood that the flexible members 1600 may be made of any material suitable to achieve a desired degree of resilience in order to fine tune the amount of "side-to-side" pivot/rocking motion and/or shock absorption properties imparted to the adjustable saddle, based on a durometer property of the material. This rocking movement allows a cyclist to perform a physiologically correct pedaling motion. As the pelvis has the freedom to move with the natural pedaling motion, discomfort or pain in the back, hips and pelvis may be reduced and pedaling may be more natural and comfortable. The rocking motion may adapt for differences in hip flexibility and skeletal geometry for a given rider. This dynamic saddle design may also compensate for discrepancies such as different leg lengths. The rocking motion may also allow for continuous change and variation in sitting positions reducing pain and discomfort. This dynamic motion may also help the spinal discs of the rider to align providing a more symmetrical load.

The rear mounting bracket 1330 may also include one or more rear attachment apertures 1396 configured to receive one or more attachment accessories, as discussed previously. In this manner, one or more rear tailpieces may be provided with various different styles of mounting brackets for additional attachments, including but not limited to: water bottle brackets, water bottle cages, $CO_2$ cartridges, toolkits, spare parts, and the like. The rear mounting bracket 1330 may also include one or more attachment fasteners (not shown) to help couple the one or more attachment accessories to the rear mounting bracket 1330 and/or help couple the rear mounting bracket 1330 to the first upper rail 1351 and the second upper rail 1372.

Figure 16A:
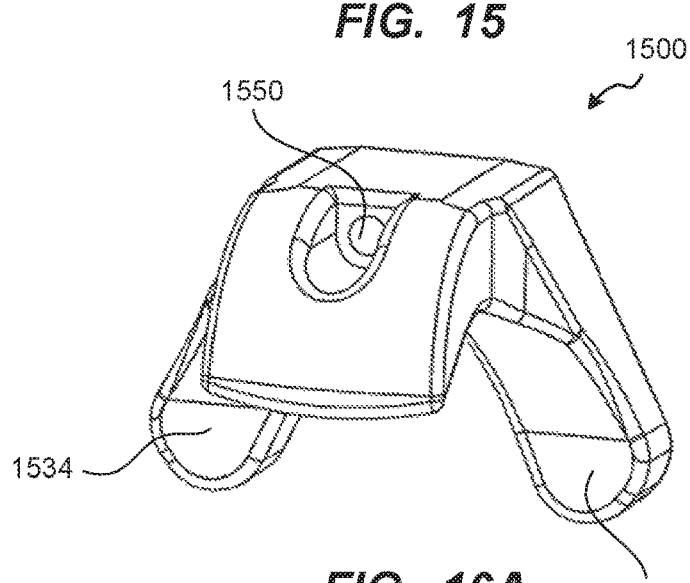
FIG. 16A illustrates an isometric front view of an example front mounting bracket that may be used with the chassis shown in FIGS. 13A-13C.
Figure 16B:
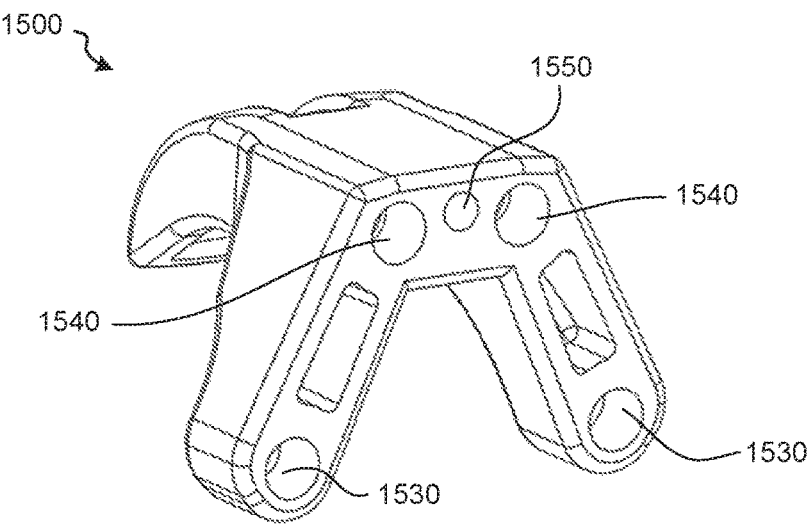
FIG. 16B illustrates an isometric rear view of the front mounting bracket shown in FIG. 16A.

FIGS. 16A and 16B illustrate isometric front and rear views of the nose piece 1500. The nose piece 1500 may be shaped to act as a transition hook to hold a bike on a rail and/or facilitate transitions between different triathlon events. As can be seen in FIGS. 12-13C, the nose piece 1500 may be attached to the front mounting bracket 1310 via a nose piece adjustment screw 1510 which may pass through an attachment aperture 1550 formed in the front mounting bracket 1310. The nose piece 1500 may also include upper rail apertures 1540 configured to receive the first and second upper rails 1351, 1372 there in, as well as a third lower rail housing 1533 and a second lower rail housing 1534 with lower rail apertures 1530 formed therein configured to receive the first and second lower rails 1360, 1380. In at least one embodiment (not shown), the third lower rail housing 1533 and the second lower rail housing 1534 may also be configured to house flexible members to further provide shock absorption characteristics to the adjustable saddle 20, isolate the adjustable saddle 20 from road vibrations, and/or provide a "side-to-side" pivot motion of the adjustable saddle 20 as the rider pedals the bicycle.

Figure 17:
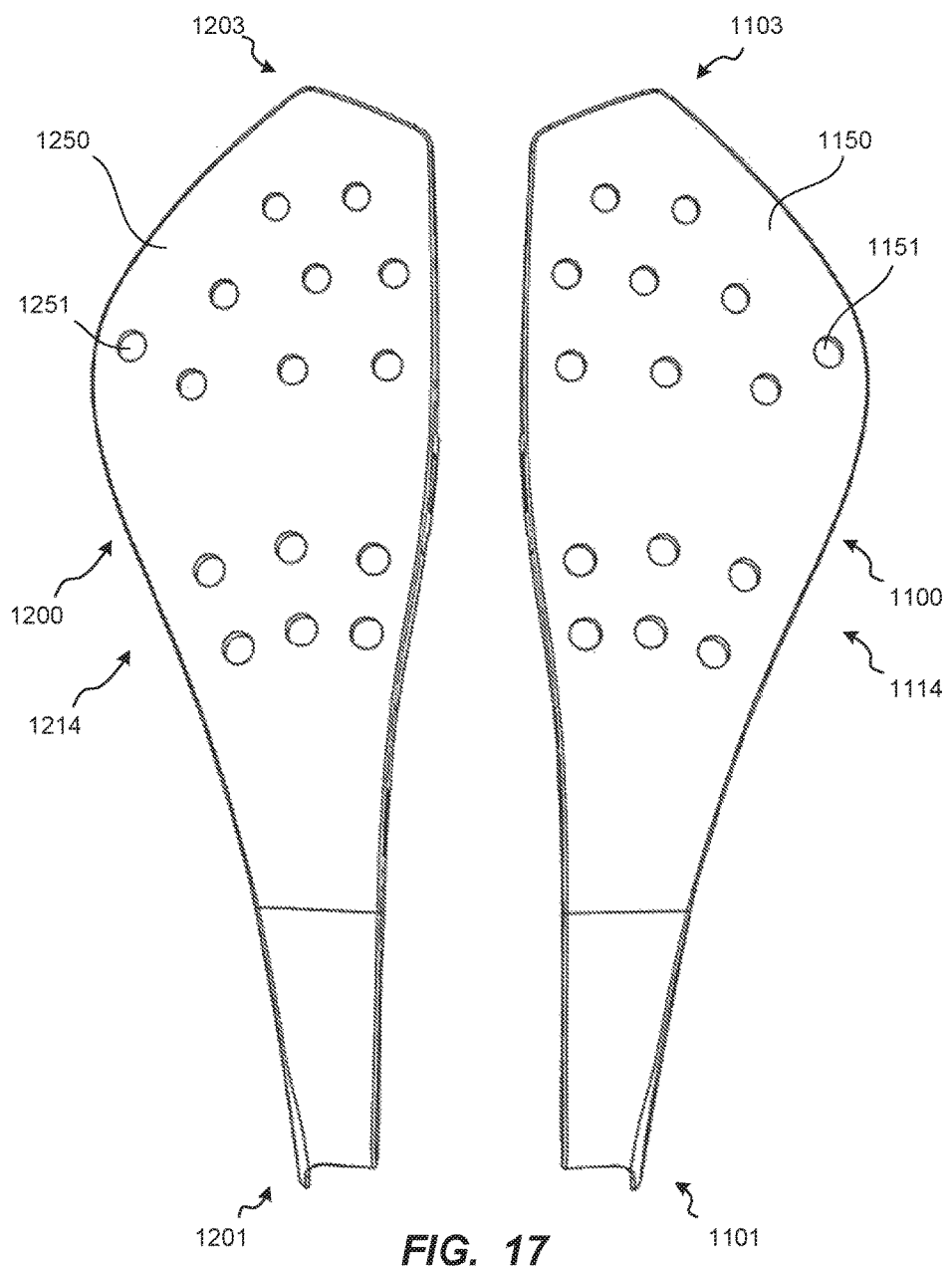
FIG. 17 illustrates a top view of the saddle half bases shown in FIG. 12.
Figure 18:
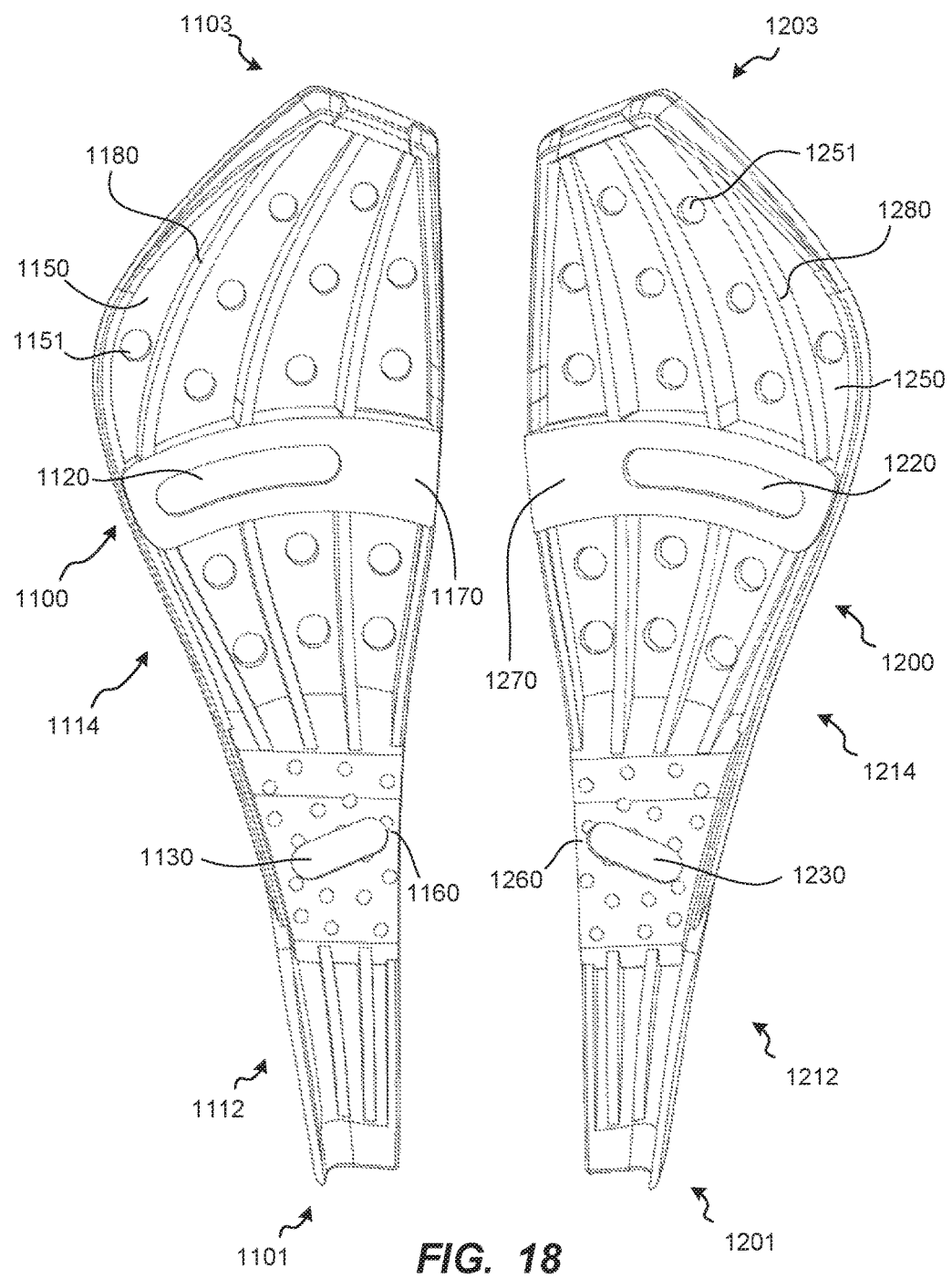
FIG. 18 illustrates a bottom view of the saddle half bases shown in FIG. 12.

FIGS. 17 and 18 show top and bottom views of the first saddle half base 1114 and the second saddle half base 1214, corresponding to each saddle half 1100, 1200, with foam padding and seat covers removed. The first and second saddle half bases 1114, 1214 may be formed of one or more rigid materials, including but not limited to: plastics, metals, carbon fiber, Zytel®, composite materials, or the like.

The first and second saddle half bases 1114, 1214 may include a first aperture 1130 and a second aperture 1230 formed in the front ends 1112, 1212 of the first and second saddle half bases 1114, 1214. In at least one embodiment, the first and second apertures 1130, 1230 may be angled slots allowing pivotal and/or translational adjustment of the front ends 1101, 1201 of the saddle halves 1100, 1200 relative to the front mounting bracket 1310. The apertures 1130, 1230 may include front retainer housings 1160, 1260 configured to retain and/or couple to suitable retainer nuts (not shown) that may be placed within the front retainer housings 1160, 1260. The retainer nuts may be configured to receive the first and second fasteners through the first and second apertures 1130, 1230 and couple to the first and second fasteners by any suitable method, such as complementary threading.

The first and second saddle half bases 1114, 1214 may further include a first arcuate adjustment channel 1120 and a second arcuate adjustment channel 1220 formed in the back ends of the first and second saddle half bases 1114, 1214. The first arcuate adjustment channel 1120 may be configured to receive the third fastener and the second arcuate adjustment channel 1220 may be configured to receive the fourth fastener. The first saddle half base 1114 may be slidably positionable relative to the third fastener positioned within the first arcuate adjustment channel 1120 to allow pivotal attachment of the back end of the first saddle half base 1114 relative to the rear mounting bracket 1330. Likewise, the second saddle half base 1214 may be slidably positionable relative to the fourth fastener positioned within the second arcuate adjustment channel 1220 to allow pivotal attachment of the back end 210 of the second saddle half base 1214 relative to the rear mounting bracket 1330. The first and second arcuate adjustment channels 1120, 1220 include rear retainer housings 1170, 1270 which may be configured to retain and/or couple to suitable retainer nuts (not shown) placed within the rear retainer housings 1170, 1270. The retainer nuts may be configured to receive the third and fourth fasteners through the first and second arcuate adjustment channels 1120, 1220 and couple to the third and fourth fasteners by any suitable method, such as complementary threading.

The first and second saddle half bases 1114, 1214 may include a plurality of longitudinal ribs 1180, 1280 that are configured to provide rigid support for the rider's weight. The first and second saddle half bases 1114, 1214 may also include a first skin 1150 and a second skin 1250 that cover the plurality of longitudinal ribs 1180, 1280. In at least one embodiment, the first and second skins 1150, 1250 may be made of a rigid material (e.g., plastic) and may be removably couplable to the plurality of longitudinal ribs 1180, 1280. For example, the first and second skins 1150, 1250 may be removably couplable to the plurality of longitudinal ribs 1180, 1280 via one or more snap features (not shown) that are configured to couple the first and second skins 1150, 1250 to the first and second saddle half bases 1114, 1214. However, in other embodiments, the first and second skins 1150, 1250 may be integrally formed with and/or coupled to the plurality of longitudinal ribs 1180, 1280. The first and second skins 1150, 1250 may also include one or more apertures 1151, 1251 formed in the surfaces of the first and second skins 1150, 1250. A first foam padding and a second padding (not shown) may also be coupled to the first and second skins 1150, 1250 respectively by any suitable means (e.g., adhesive). Moreover, the first foam padding and the second padding foam padding may be further covered by a first seat cover and a second seat cover. In this manner, the rider may easily and quickly customize his or her adjustable saddle 20 by simply removing the first and second skins 1150, 1250 with their corresponding foam paddings and seat covers and then replacing them with different first and second skins 1150, 1250 of their choice. This allows the rider to select an adjustable saddle configuration with first and second skins 1150, 1250 that can have any color, size, shape, material, etc.

Figure 19A:
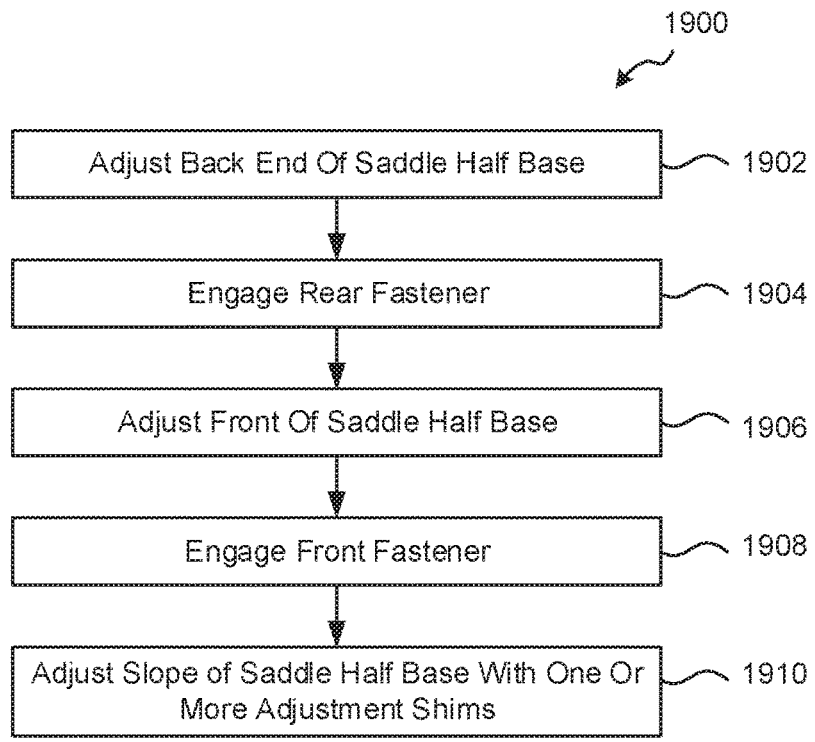
FIG. 19A is a flowchart illustrating a method of adjusting the adjustable saddles of the present disclosure.

FIG. 19A illustrates a flowchart of a method 1900 by which adjustable saddles of the present disclosure may be adjusted. The method 1900 may begin with a step 1902 in which a back end of a saddle half base may be adjusted. In this step, a back end of at least one saddle half base may be slidably, translationally, and/or pivotally positioned relative to a rear mounting bracket. The at least one saddle half base may have a back end with an arcuate adjustment channel formed therein which may be configured to receive a rear fastener. Additionally, in at least one embodiment, the rear mounting bracket may include multiple apertures configured to receive the rear fastener. In this manner, the back end of the at least one saddle half base may be attached to the rear mounting bracket at different locations along the rear mounting bracket to positionally translate the least one saddle half base relative to the rear mounting bracket.

Once the back end of the at least one saddle half base has been adjusted to a desired position, the method 1900 may proceed to a step 1904 in which the rear fastener may be engaged to prevent the back end of the at least one saddle half base from moving relative to the rear mounting bracket.

Once the back end of the at least one saddle half base has been adjusted and fastened in place, the method 1900 may proceed to a step 1906 in which a front end of the at least one saddle half base may be adjusted. In this step, the front end of the at least one saddle half base may be slidably, translationally, and/or pivotally positioned relative to a front mounting bracket. In at least one embodiment, the front mounting bracket may include at least one angled slot formed therein configured to receive a front fastener. In other embodiments, the front mounting bracket may include multiple apertures formed therein and configured to receive the front fastener and the at least one saddle half base may include at least one angled slot formed therein configured to receive the front fastener.

Once the front end of the at least one saddle half base has been adjusted to a desired position, the method 1900 may proceed to a step 1908 in which the front fastener may be engaged to prevent the front end of the at least one saddle half base from sliding relative to the front mounting bracket.

Alternatively, or in addition thereto, the method 1900 may include a step 1910 in which a height, angle, side-to side flatness, and/or front-to-back slope of the at least one saddle half base may be adjusted with one or more adjustment shims. The one or more adjustment shims may be used in conjunction with a chassis of the adjustable saddle to adjust the height, angle, side-to side flatness, and/or front-to-back slope of the at least one saddle half base. For example, at least one adjustment shim may be placed between at least one of the front and rear mounting brackets and the at least one saddle half base to adjust the height, angle, side-to side flatness, and/or front-to-back slope of the at least one saddle half base. In this step, any number or combination of adjustment shims may be used in any desired configuration to individually adjust the height, angle, side-to side flatness, and/or front-to-back slope of the at least one saddle half base.

Figure 19B:
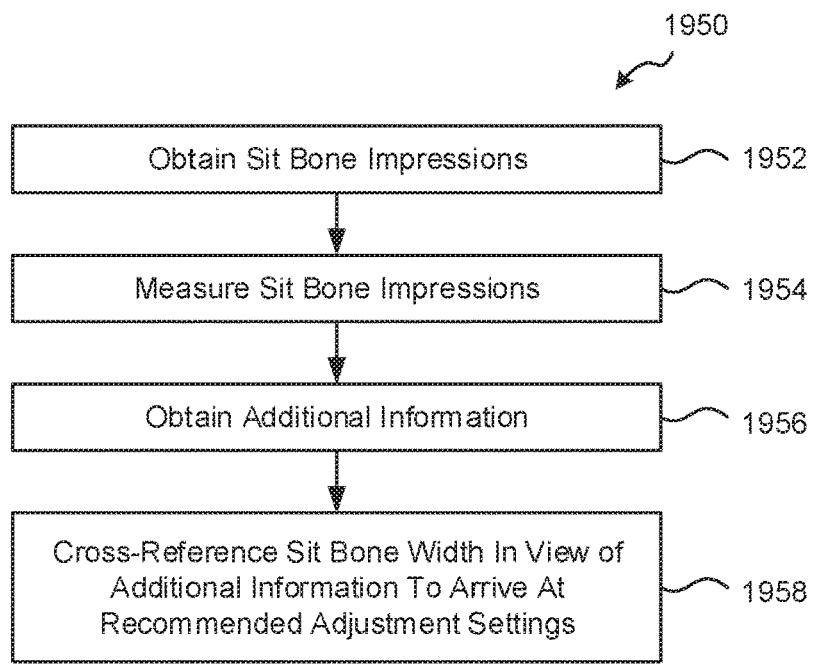
FIG. 19B is a flowchart illustrating a method of obtaining recommended adjustment settings for an individual.

FIG. 19B illustrates a flowchart of a method 1950 by which recommended adjustment settings for an individual may be obtained to facilitate an adjustment process. The method 1950 may begin with a step 1952 in which sit bone impressions may be obtained for an individual. The sit bone impressions may be obtained by seating the individual on top of a compressible material to form the sit bone impressions. In at least one embodiment, the compressible material may comprise compressible corrugated cardboard that is configured to form the sit bone impressions.

Once the sit bone impressions have been formed, the method 1950 may proceed to a step 1954 in which sit bone measurements may be obtained from the sit bone impressions. The sit bone impressions may be measured to obtain an approximate sit bone width for the individual.

Once the approximate sit bone measurements have been obtained from the sit bone impressions, the method may proceed to a step 1956 in which additional information from the individual may be obtained for use as additional input in formulating recommended adjustment settings for the individual. The additional information may include any relevant information including but not limited to: a preferred riding position of the individual (e.g., upright vs. race position, and/or every riding position in between), different bike applications (e.g., road bike, triathlon bike, mountain bike, police bike applications, etc.), a specific morphology or medical condition of the individual, a gender of the individual, and the like.

Once the additional information is obtained from the individual, the method 1950 may proceed to a step 1958 in which recommended adjustment settings may be obtained by cross-referencing the individuals approximate sit bone width, in view of the additional information obtained from the individual, to arrive at recommended adjustment settings for the individual.

Any methods disclosed herein may comprise one or more steps or actions for performing the described method. The method steps and/or actions may be interchanged with one another. In other words, unless a specific order of steps or actions is required for proper operation of the embodiment, the order and/or use of specific steps and/or actions may be modified.

Reference throughout this specification to "an embodiment" or "the embodiment" means that a particular feature, structure or characteristic described in connection with that embodiment is included in at least one embodiment. Thus, the quoted phrases, or variations thereof, as recited throughout this specification are not necessarily all referring to the same embodiment.

Similarly, it will be appreciated that in the above description of embodiments, various features are sometimes grouped together in a single embodiment, figure, or description for the purpose of streamlining the disclosure. This method of disclosure, however, is not to be interpreted as reflecting an intention that any claim in this or any application claiming priority to this application require more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

Recitation in the claims of the term "first" with respect to a feature or element does not necessarily imply the existence of a second or additional such feature or element. Only elements recited in means-plus-function format are intended to be construed in accordance with 35 U.S.C. § 112 Para. 6. It will be apparent to those having skill in the art that changes may be made to the details of the above-described embodiments without departing from the underlying principles of the disclosure.

While specific embodiments and applications of the present disclosure have been illustrated and described, it is to be understood that the disclosure is not limited to the precise configuration and components disclosed herein. Various modifications, changes, and variations which will be apparent to those skilled in the art may be made in the arrangement, operation, and details of the methods and systems of the present disclosure herein without departing from the spirit and scope of the disclosure.

What is claimed is:

1. An adjustable saddle, comprising:
   a front mounting bracket having at least one first aperture configured to receive a first fastener and at least one second aperture configured to receive a second fastener;
   a rear mounting bracket having a third aperture configured to receive a third fastener and a fourth aperture configured to receive a fourth fastener;
   a first saddle half comprising a first saddle half base having a front end and a back end, the front end of the first saddle half base configured to receive the first fastener to pivotally attach the front end of the first saddle half base to the front mounting bracket in at least two different pivot points, the back end of the first saddle half base having a first arcuate adjustment channel configured to receive the third fastener therein, wherein the first saddle half base is slidably positionable relative to the third fastener positioned within the first arcuate adjustment channel to allow pivotal attachment of the back end of the first saddle half base to the rear mounting bracket; and
   a second saddle half comprising a second saddle half base having a front end and a back end, the front end of the second saddle half base configured to receive the second fastener to pivotally attach the front end of the second saddle half base to the front mounting bracket in at least two different pivot points, the back end of the second saddle half base having a second arcuate adjustment channel configured to receive the fourth fastener therein, wherein the second saddle half base is slidably positionable relative to the fourth fastener positioned within the second arcuate adjustment channel to allow pivotal attachment of the back end of the second saddle half base to the rear mounting bracket.

2. The adjustable saddle of claim 1, wherein the at least one first aperture comprises one of a first angled slot, and a plurality of first apertures configured to enable pivotal attachment of the front end of the first saddle half base to the front mounting bracket in at least two different pivot points, and wherein the at least one second aperture comprises one of a second angled slot, and a plurality of second apertures configured to enable pivotal attachment of the front end of the second saddle half base to the front mounting bracket in at least two different pivot points.

3. The adjustable saddle of claim 1, wherein the first, second, third, and fourth fasteners comprise cross drilled threaded screws configured to be received within corresponding retainer nuts coupled to the first and second saddle half bases.

4. The adjustable saddle of claim 1, further comprising one or more adjustment shims placed between at least one of the front and rear mounting brackets and at least one of the first and second saddle half bases to adjust a slope associated with the at least one of the first and second saddle half bases.

5. The adjustable saddle of claim 1, further comprising one or more attachment accessories, the one or more attachment accessories comprising at least one of: a rear tailpiece, a water bottle cage, a CO2 cartridge, a toolkit, and a spare part.

6. The adjustable saddle of claim 1, further comprising:
   a first skin topped with a first foam padding and a first seat cover; and
   a second skin topped with a first foam padding and a first seat cover, wherein the first skin is removably couplable from the first saddle half base, and the second skin is removably couplable from the second saddle half base.

7. The adjustable saddle of claim 1, further comprising:
   a first lower rail;
   a second lower rail;
   a first upper rail; and
   a second upper rail, wherein the front mounting bracket is slidably adjustable along a length of the first upper rail and the second upper rail by selectively turning a nose piece adjustment screw to vary a distance between the front mounting bracket and the rear mounting bracket.

8. The adjustable saddle of claim 7, wherein the rear mounting bracket further comprises:
a first lower rail housing;
a second lower rail housing;
a first flexible member; and
a second flexible member, wherein the first lower rail housing is configured to receive the first flexible member, the first flexible member is configured to receive the first lower rail, the second lower rail housing is configured to receive the second flexible member, the second flexible member is configured to receive the second lower rail, and wherein the first flexible member and the second flexible member are configured to provide shock absorption for the adjustable saddle.

9. The adjustable saddle of claim 7, wherein at least one of the front mounting bracket, the rear mounting bracket, the first lower rail, the second lower rail, the first upper rail, and the second upper rail further comprises adjustment markings.

10. An adjustable saddle, comprising:
a chassis including:
a first upper rail;
a second upper rail;
a front mounting bracket coupled to the first upper rail and the second upper rail, the front mounting bracket having one of a first angled slot and a plurality of first apertures configured to receive a first fastener and one of a second angled slot and a plurality of second apertures configured to receive a second fastener; and
a rear mounting bracket coupled to the first upper rail and the second upper rail, the front mounting bracket having third apertures configured to receive a third fastener and fourth apertures configured to receive a fourth fastener, the front mounting bracket slidably attached to the first upper rail and the second upper rail;
a first saddle half base having a front end and a back end, the front end of the first saddle half base configured to receive the first fastener to pivotally attach the front end of the first saddle half base to the front mounting bracket, the back end of the first saddle half base having a first arcuate adjustment channel configured to receive the third fastener therein, wherein the first saddle half base is slidably positionable relative to the third fastener positioned within the first arcuate adjustment channel to allow pivotal attachment of the back end of the first saddle half base to the rear mounting bracket; and
a second saddle half base having a front end and a back end, the front end of the second saddle half base configured to receive the second fastener to pivotally attach the front end of the second saddle half base to the front mounting bracket, the back end of the second saddle half base having a second arcuate adjustment channel configured to receive the fourth fastener therein, wherein the second saddle half base is slidably positionable relative to the fourth fastener positioned within the second arcuate adjustment channel to allow pivotal attachment of the back end of the second saddle half base to the rear mounting bracket.

11. The adjustable saddle of claim 10, wherein the front mounting bracket is slidably adjustable along a length of the first upper rail and the second upper rail by selectively turning a nose piece adjustment screw to vary a distance between the front mounting bracket and the rear mounting bracket.

12. The adjustable saddle of claim 10, wherein the one of the first angled slot and the plurality of first apertures enables pivotal attachment of the front end of the first saddle half base to the front mounting bracket in at least two different pivot points, and wherein the one of the second angled slot and the plurality of second apertures enables pivotal attachment of the front end of the second saddle half base to the front mounting bracket in at least two different pivot points.

13. The adjustable saddle of claim 10, wherein the first, second, third, and fourth fasteners comprises cross drilled threaded screws configured to be received within corresponding retainer nuts coupled to the first and second saddle half bases.

14. The adjustable saddle of claim 10, wherein at least one of the front mounting bracket, the rear mounting bracket, the first upper rail, and the second upper rail further comprises adjustment markings.

15. The adjustable saddle of claim 10, further comprising one or more adjustment shims placed between at least one of the front and rear mounting brackets and at least one of the first and second saddle half bases to adjust a slope associated with at least one of the first and second saddle half bases.

16. The adjustable saddle of claim 10, further comprising one or more attachment accessories, the one or more attachment accessories comprising at least one of: a transition hook, a rear tailpiece, a water bottle cage, a CO2 cartridge, a toolkit, and a spare part.

17. The adjustable saddle of claim 10, further comprising:
a first skin topped with a first foam padding and a first seat cover; and
a second skin topped with a second foam padding and a second seat cover, wherein the first skin is removably couplable from the first saddle half base, and the second skin is removably couplable from the second saddle half base.

18. A method of adjusting an adjustable saddle having at least a first pivot point and a second pivot point, the method comprising:
selecting one of the first pivot point and the second pivot point, wherein the front end of a saddle half base is attachable to either of the first pivot point and the second pivot point;
positioning a front end of the saddle half base relative to a front mounting bracket at the selected one of the first pivot point and the second pivot point;
slidably positioning a back end of the saddle half base relative to a rear mounting bracket, the back end of the saddle half base having an arcuate adjustment channel formed therein configured to receive a rear fastener;
engaging the rear fastener to prevent the back end of the saddle half base from moving relative to the rear mounting bracket; and
engaging the front end of the saddle half base to the front mounting bracket with a front fastener to prevent the front end of the saddle half base from moving relative to the front mounting bracket.

19. The method of claim 18, wherein positioning the front end of the saddle half base relative to the front mounting bracket at one of the first pivot point and the second pivot point further comprises slidably positioning the front end of the saddle half base relative to the front mounting bracket along an angled slot formed in the front mounting bracket.

20. The method of claim 19, further comprising:

adjusting a slope of the saddle half base by placing one or more adjustment shims between at least one of the front and rear mounting brackets and the saddle half base to adjust a slope of the saddle half base.

* * * * *